(12) United States Patent
Fujisaki et al.

(10) Patent No.: US 12,346,773 B2
(45) Date of Patent: Jul. 1, 2025

(54) ERROR DETECTION METHOD AND INFORMATION PROCESSING APPARATUS

(71) Applicants: Fujitsu Limited, Kawasaki (JP); OSAKA UNIVERSITY, Suita (JP)

(72) Inventors: Jun Fujisaki, Kawasaki (JP); Hirotaka Oshima, Machida (JP); Keisuke Fujii, Suita (JP)

(73) Assignees: Fujitsu Limited, Kawasaki (JP); OSAKA UNIVERSITY, Suita (JP)

( * ) Notice: Subject to any disclaimer, the term of this patent is extended or adjusted under 35 U.S.C. 154(b) by 167 days.

(21) Appl. No.: 18/226,785

(22) Filed: Jul. 27, 2023

(65) Prior Publication Data

US 2024/0086756 A1 Mar. 14, 2024

(30) Foreign Application Priority Data

Sep. 9, 2022 (JP) .................... 2022-143513

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
None
See application file for complete search history.

(56) References Cited

U.S. PATENT DOCUMENTS

| | | | |
|---|---|---|---|
| 11,455,207 B2 * | 9/2022 | Chamberland | G06N 10/20 |
| 11,556,411 B2 * | 1/2023 | Cross | G06N 10/70 |
| 2019/0122133 A1 | 4/2019 | Zohren et al. | |
| 2020/0119748 A1 * | 4/2020 | Lucarelli | H03M 13/11 |
| 2022/0215967 A1 * | 7/2022 | Zhao | G06N 10/60 |
| 2022/0300845 A1 * | 9/2022 | Barkoutsos | G06N 10/40 |
| 2022/0405629 A1 * | 12/2022 | Ella | G06N 10/40 |

(Continued)

FOREIGN PATENT DOCUMENTS

| | | |
|---|---|---|
| JP | 2019-531531 A | 10/2019 |
| JP | 2005-530619 A | 10/2020 |

(Continued)

OTHER PUBLICATIONS

Roffe et al., "Quantum Error Correction: An Introductory Guide", Jul. 25, 2019, Department of Physics & Astronomy, University of Sheffield https://doi.org/10.48550/arXiv.1907.11157 (Year: 2019).*

(Continued)

*Primary Examiner* — Daniel F. McMahon

(74) *Attorney, Agent, or Firm* — XSENSUS LLP

(57) ABSTRACT

An information processing apparatus determines a combination of a first data qubit and a second data qubit that further reduces the energy represented by an energy equation. The energy equation includes first to third energy terms. The first energy term is used to identify the first data qubit on which a Z error has occurred. The second energy term is used to identify the second data qubit on which an X error has occurred. The third energy term reduces the energy as the number of data qubits each being a third data qubit on which both a Z error and an X error have simultaneously occurred increases. The information processing apparatus determines that a Y error has occurred on the third data qubit.

7 Claims, 31 Drawing Sheets

(56) References Cited

U.S. PATENT DOCUMENTS

| | | | | |
|---|---|---|---|---|
| 2023/0419142 | A1* | 12/2023 | Heo | G06N 10/00 |
| 2024/0185113 | A1* | 6/2024 | Cong | G06N 10/70 |
| 2024/0354630 | A1* | 10/2024 | Lee | G06N 10/40 |

FOREIGN PATENT DOCUMENTS

| | | |
|---|---|---|
| JP | 2021-507401 A | 2/2021 |
| JP | 2021-106029 A | 7/2021 |
| WO | 2017/078734 A1 | 5/2017 |
| WO | 2018/026522 A1 | 2/2018 |
| WO | 2019/032103 A1 | 2/2019 |
| WO | 2019/126644 A1 | 6/2019 |

OTHER PUBLICATIONS

Fujii et al., "Measurement-Free Topological Protection Using Dissipative Feedback", American Physical Society, Physical Review X, vol. 4, 041039, 2014, pp. 041039-1-041039-11.

Joschka Roffe et al., "Decoding quantum error correction with Ising model hardware", arXiv:1903.10254v1 [quant-ph], Mar. 25, 2019, pp. 1-13.

Kirkpatrick et al., "Optimization by Simulated Annealing", Science, New Series, vol. 220, No. 4598, May 13, 1983, pp. 671-680.

Extended European Search Report issued Feb. 12, 2024 in corresponding European Patent Application No. 23185291.4, 7 pages.

Fujisaki, et al.; "A Practical and Scalable Decoder for Topological Quantum Error Correction with Digital Annealer", arxiv.org, Cornell University Library, 201 Olin Library Cornell University Ithaca, NY 14853, Mar. 29, 2022 (Mar. 29, 2022), XP091185937.

Ellison, et al.; "Pauli stabilizermodels of twisted quantum doubles", arxiv.org, Cornell University Library, 201 Olin Library Cornell University Ithaca, NY 14853, Apr. 30, 2022 (Apr. 30, 2022), XP091196452, DOI: 10.1103/PRXQUANTUM.3.010353.

Varsamopoulos, et al.; "Decoding surface code with a distributed neural network-based decoder", Quantum Machine Intelligence, [Online] vol. 2, No. 1, Feb. 6, 2019 (Feb. 6, 2019), XP055922190, ISSN: 2524-4906, DOI: 10.1007/s42484-020-00015-9 Retrieved from the Internet: URL:https://arxiv.org/pdf/1901.10847.pdf> [retrieved on Jan. 23, 2024].

\* cited by examiner

□ : DATA QUBIT

: ANCILLA QUBIT (X ERROR DETECTION)

: ANCILLA QUBIT (Z ERROR DETECTION)

- ☐ : DATA QUBIT
- ⊏⊐ : ANCILLA QUBIT (X ERROR DETECTION)
- ⌐¬ : ANCILLA QUBIT (Z ERROR DETECTION)
- ▨ : DATA QUBIT WITH ERROR
- ▩ : FLIPPED ANCILLA QUBIT (X ERROR DETECTION)
- ■ : FLIPPED ANCILLA QUBIT (Z ERROR DETECTION)

91 Y-ERROR IDENTIFICATION RATE TABLE

| $J'_a$ \ $J'_b$ | 0.0 | 0.2 | 0.4 | 0.8 | 1.0 | 2.0 | 4.0 | 8.0 |
|---|---|---|---|---|---|---|---|---|
| 0.0 | (19.4) | 17.3 | 19.3 | 19.8 | 22.0 | 24.4 | 28.9 | 33.6 |
| 0.2 | 19.0 | 20.0 | 20.8 | 21.5 | 22.0 | 25.4 | 32.6 | 37.9 |
| 0.4 | 19.7 | 22.3 | 19.9 | 23.2 | 25.7 | 27.2 | 35.3 | 36.1 |
| 0.8 | 23.3 | 23.1 | 25.0 | 27.7 | 27.2 | 31.9 | 34.9 | 38.5 |
| 1.0 | 25.2 | 26.5 | 27.5 | 29.8 | 29.6 | 32.5 | 37.2 | 41.4 |
| 2.0 | 33.4 | 35.1 | 33.1 | 36.1 | 35.4 | 40.4 | 43.9 | 45.4 |
| 4.0 | 44.0 | 44.1 | 45.9 | 48.3 | 47.1 | (49.4) | 50.2 | 53.2 |

SMALL ⟵⟶ LARGE ($J'_b$)

SMALL ↕ LARGE ($J'_a$)

FIG. 28

ERROR DETECTION METHOD AND INFORMATION PROCESSING APPARATUS

CROSS-REFERENCE TO RELATED APPLICATION

This application is based upon and claims the benefit of priority of the prior Japanese Patent Application No. 2022-143513, filed on Sep. 9, 2022, the entire contents of which are incorporated herein by reference.

FIELD

The embodiments discussed herein relate to an error detection method and an information processing apparatus.

BACKGROUND

Quantum computers are used for a variety of computations. For example, a quantum computer may be used to find the minimum value of energy in a model of computation. The quantum computer implements the computation by performing initialization, gate operations, and measurement on a plurality of qubits. In the quantum computer, errors (physical errors) occur on qubits due to environmental noise and others during the qubit manipulation. In order to identify error qubits and the types of the errors, the quantum computer introduces qubit redundancy, as in conventional computers (which may be called classical computers).

Surface code is a method of identifying error qubits and the types of the errors using redundant qubits. In a surface code, data qubits and ancilla qubits are alternately arranged in a two-dimensional lattice. Among the plurality of qubits (data qubits and ancilla qubits) arranged in the lattice, the states of the data qubits are encoded into one logical qubit. The ancilla qubits are used, column by column, either for X error detection or for Z error detection. In the surface code, the quantum computer first initializes the logical quantum state properly, and for error detection, performs gate operations between one ancilla qubit and its four neighboring data qubits and measures the ancilla qubit. The quantum computer detects an X error (bit flip error) or a Z error (phase flip error) on the basis of the value of the ancilla qubit. Then, using information indicating the type of the error and positional information of a data qubit identified as the error location, the quantum computer performs a gate operation for qubit error correction.

As a technique for the qubit error correction, there has been proposed a quantum computing system of continuously optimizing quantum gate parameters while performing error correction, for example. Further, there has been proposed a technique for reducing parasitic interactions in a qubit grid for surface code error correction. Still further, there has been proposed a system that is easy to build and has lower error correction overhead.

In this connection, as a technique for energy minimization by a quantum computer, for example, there is a technique of preparing correlated fermionic states on a quantum computer for determining a ground state of a correlated fermionic system. In addition, there is also a technique relating to a method of forming coupling interactions between three or more information qubits.

See, for example, Japanese Laid-open Patent Publication No. 2021-106029, Japanese National Publication of International Patent Application No. 2020-530619, Japanese National Publication of International Patent Application No. 2019-531531, Japanese National Publication of International Patent Application No. 2021-507401, and U.S. patent application publication No. 2019/0122133.

SUMMARY

According to one aspect, there is provided a non-transitory computer-readable storage medium storing a computer program that causes a computer to perform a process including: obtaining first state data and second state data, the first state data indicating states of a plurality of first ancilla qubits used for Z error detection on a plurality of data qubits included in a logical qubit in quantum computation, the second state data indicating states of a plurality of second ancilla qubits used for X error detection on the plurality of data qubits; determining, based on an energy equation, a combination of a first data qubit with a Z error and a second data qubit with an X error that further reduces an energy represented by the energy equation, the energy equation including a first energy term, a second energy term, and a third energy term, the first energy term being used to identify the first data qubit among the plurality of data qubits, based on the first state data, the second energy term being used to identify the second data qubit among the plurality of data qubits, based on the second state data, the third energy term being to reduce the energy as a number of data qubits each being a third data qubit increases, the third data qubit being identified both as the first data qubit and as the second data qubit; and determining that a Y error has occurred on the third data qubit, the Z error has occurred on the first data qubit that is not identified as the third data qubit, and the X error has occurred on the second data qubit that is not identified as the third data qubit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 28 illustrates a result of calculating a Y error identification rate;

DESCRIPTION OF EMBODIMENTS

In the surface code, the X error and the Z error are each detected as a bit flip of the ancilla qubit. In addition, in the quantum computer, a Y error (an error due to an erroneous action of a Pauli operator Y) may also occur. The Pauli operator Y may be expressed as "Y=iXZ" (i is an imaginary unit) using Pauli operators X and Z.

The surface code is not able to directly detect Y errors. Therefore, when X and Z errors occur simultaneously on a certain qubit, the surface code determines that a Y error has occurred on the qubit.

However, if an X or Z error occurs on a qubit neighboring a qubit with a Y error, the surface code may fail to correctly identify the location of the Y error. For example, there is an error occurrence pattern in which two errors, a Z error and a Y error, occur simultaneously on adjacent qubits. In this pattern, three qubits are incorrectly identified as error locations with a high probability. If error locations are incorrectly identified, the quantum computer fails the subsequent error correction and is thus unable to obtain a correct computation result.

Note that the problem that it is difficult to correctly identify the locations of Y errors arises not only in surface codes but also in general Calderbank-Shor-Steane (CSS) codes with stabilizers.

Embodiments will be described with reference to the accompanying drawings. Some of the embodiments may be combined unless they exclude each other.

First Embodiment

A first embodiment relates to an error detection method that is able to identify the locations of Y errors that occur in the course of quantum computation, in a surface code with a high probability.

Figure 1:
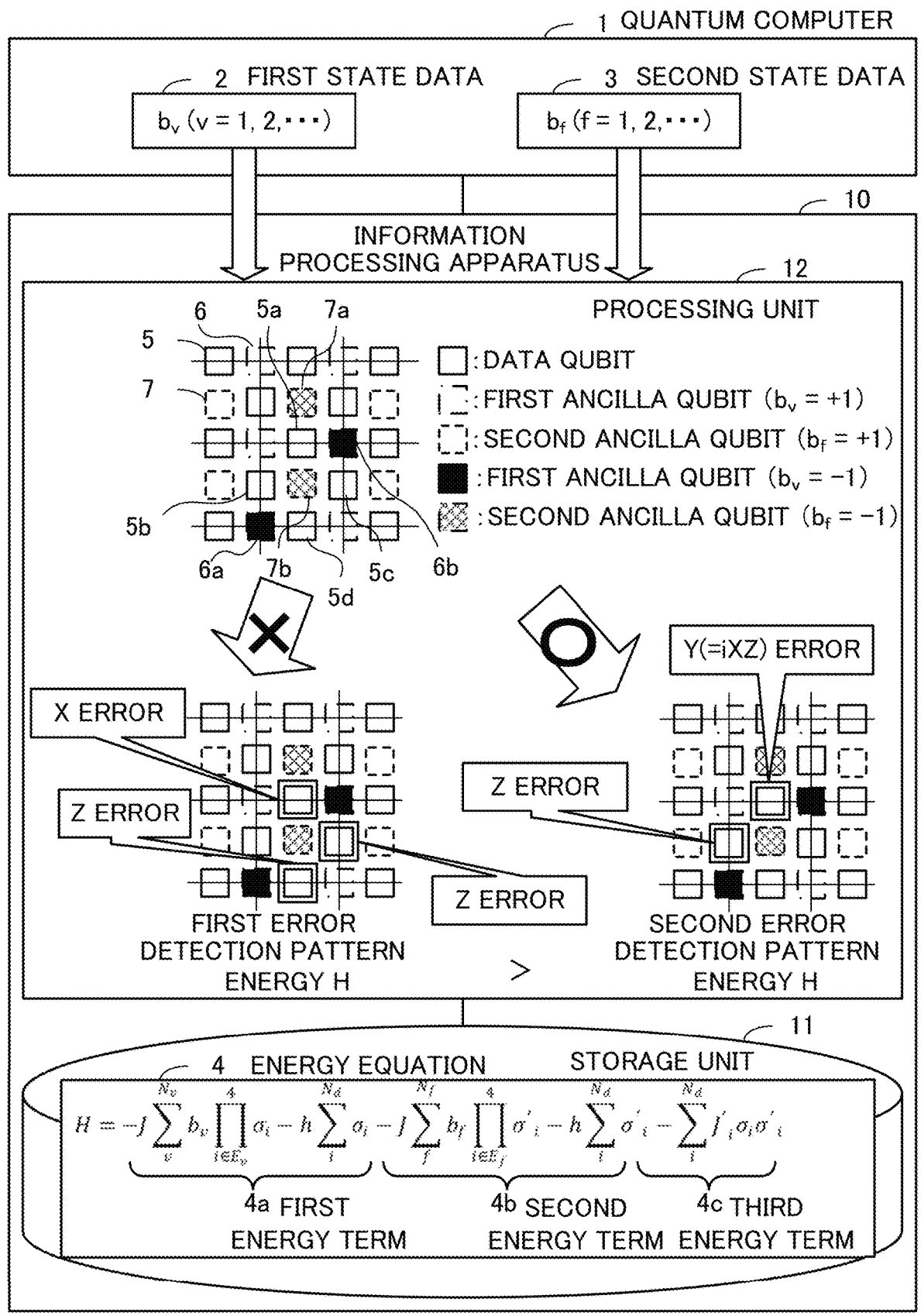
FIG. 1 illustrates an example of an error detection method according to a first embodiment.

FIG. 1 illustrates an example of an error detection method according to the first embodiment. An information processing apparatus 10 illustrated in FIG. 1 executes the error detection method of the first embodiment. The information processing apparatus 10 is able to execute the error detection method by, for example, running an error detection program.

The information processing apparatus 10 includes a storage unit 11 and a processing unit 12. The storage unit 11 is a memory or storage device provided in the information processing apparatus 10, for example. The processing unit 12 is a processor or computing circuit provided in the information processing apparatus 10, for example.

For example, the information processing apparatus 10 instructs a quantum computer 1 to perform quantum computation according to a predetermined quantum circuit. The quantum computer 1 performs the quantum computation by performing gate operations on a plurality of physical qubits. At this time, the quantum computer 1 represents the states of the qubits to be manipulated by the quantum circuit as a logical qubit that is made up of the plurality of physical qubits. In the following, the physical qubits that define the state of the logical qubit are data qubits 5 (represented as all solid-line rectangles in FIG. 1).

In addition, the quantum computer 1 uses some physical qubits as ancilla qubits for detecting errors occurring on the data qubits included in the logical qubit in the surface code. The ancilla qubits are classified into a plurality of first ancilla qubits 6 (represented as all dash-dotted rectangles in FIG. 1) used for Z error detection and a plurality of second ancilla qubits 7 (represented as all broken-line rectangles in FIG. 1) used for X error detection.

In the course of the quantum computation performed in response to the instruction from the information processing apparatus 10, the quantum computer 1 performs gate operations for error detection in the surface code and measures the states of the first ancilla qubits 6 and second ancilla qubits 7. Then, the quantum computer 1 sends first state data 2 indicating the states of the plurality of first ancilla qubits 6 and second state data 3 indicating the states of the plurality of second ancilla qubits 7 to the information processing apparatus 10.

The information processing apparatus 10 performs an error detection process on the basis of the first state data 2 and second state data 3 to thereby detect the locations of Z errors, X errors, and Y errors. To this end, an energy equation 4 is stored in the storage unit 11. The energy equation 4 represents the energy of an Ising model into which a solving problem of identifying error locations in a surface code is formulated.

The energy equation 4 includes a first energy term 4a, a second energy term 4b, and a third energy term 4c. The first energy term 4a is used to identify first data qubits with Z errors among the plurality of data qubits 5 on the basis of the first state data 2. The second energy term 4b is used to identify second data qubits with X errors among the plurality of data qubits 5 on the basis of the second state data 3. The third energy term 4c reduces the energy as the number of third data qubits increases. Here, the third data qubits are data qubits that are each identified both as a first data qubit and as a second data qubit.

In this connection, the third energy term 4c also acts to reduce the energy as the number of data qubits without any error increases, for example. In addition, the third energy term 4c also acts to increase the energy as the number of data qubits each with only a Z error or an X error increases, for example.

The processing unit 12 of the information processing apparatus 10 obtains the first state data 2 and second state data 3 from the quantum computer 1. Then, the processing unit 12 determines a combination of first data qubits and second data qubits that further reduces the energy represented by the energy equation 4, on the basis of the first state data 2 and second state data 3. For example, the processing unit 12 obtains a combination of first data qubits and second data qubits that minimizes the energy by solving a combinatorial optimization problem expressed as an Ising model.

The processing unit 12 then determines the locations of errors and the types of the errors on the basis of the combination of first data qubits and second data qubits that minimizes the energy. For example, the processing unit 12 determines that a Z error has occurred on a data qubit that is identified as a first data qubit but is not identified as a second data qubit. Further, the processing unit 12 determines that an X error has occurred on a data qubit that is identified as a second data qubit but is not identified as a first data qubit. Still further, the processing unit 12 determines that a Y error has occurred on a data qubit that is identified both as a first data qubit and as a second data qubit.

The processing unit 12 instructs the quantum computer 1 to correct the detected errors. For example, the processing unit 12 designates a data qubit determined to have a Z error and makes an instruction to correct the Z error of the data qubit (Z gate operation). Further, the processing unit 12 designates a data qubit determined to have an X error and makes an instruction to correct the X error of the data qubit (X gate operation). Still further, the processing unit 12 designates a data qubit determined to have a Y error and makes an instruction to correct the Y error of the data qubit (Y gate operation).

The above-described approach of detecting errors including Y errors makes it possible to identify Y errors with a high probability. More specifically, since the energy equation 4 includes the third energy term 4c, the energy obtained in the case where a Y error has occurred is lower than that obtained in the case where an X error and a Z error have occurred separately.

Assume, for example, that the plurality of first ancilla qubits 6 have an initial state of "0" ($b_v=+1$) and the plurality of second ancilla qubits 7 also have an initial state of "0" ($b_f=+1$). The first state data 2 indicates that, among the plurality of first ancilla qubits 6, the states of two first ancilla qubits 6a and 6b have been flipped ($b_v=-1$). The second state data 3 indicates that, among the plurality of second ancilla qubits 7, the states of two second ancilla qubits 7a and 7b have been flipped ($b_f=-1$).

There are a plurality of error occurrence patterns on the data qubits that are able to reproduce these states of the ancilla qubits. For example, one is that an X error occurs on one data qubit 5a and Z errors occur on two data qubits 5c and 5d (this detection pattern of errors is referred to as a first error detection pattern), and this pattern produces the states of the ancilla qubits illustrated in FIG. 1. Another is that a Y error occurs on one data qubit 5a and a Z error occurs on one data qubit 5b (this detection pattern of errors is referred to as a second error detection pattern), and this pattern also produces the states of the ancilla qubits illustrated FIG. 1.

The error detection process identifies the locations of Z errors and the locations of X errors, and when detecting that both a Z error and an X error have occurred on the same data qubit, determines that a Y error has occurred on the data qubit.

The first energy term 4a in the energy equation 4 increases the energy when the number of Z errors occurring on the data qubits neighboring the flipped first ancilla qubits 6a and 6b is odd, and reduces the energy as the number of Z errors decreases. The first error detection pattern and the second error detection pattern in FIG. 1 have the same value in the first energy term 4a.

The second energy term 4b in the energy equation 4 increases the energy when the number of X errors occurring on the data qubits neighboring the flipped second ancilla qubits 7a and 7b is odd, and reduces the energy as the number of X errors decreases. The first error detection pattern and the second error detection pattern in FIG. 1 have the same value in the second energy term 4b.

The first error detection pattern does not include any third data qubit, which is identified both as a first data qubit and as a second data qubit. The second error detection pattern, on the other hand, includes the data qubit 5a as a third data qubit. Therefore, the third energy term 4c in the energy equation 4 does not act to reduce the energy with respect to the first error detection pattern, but reduces the energy with respect to the second error detection pattern. As a result, the second error detection pattern has a lower energy than the first error detection pattern.

The second error detection pattern is finally determined as the combination of first data qubits and second data qubits that further reduces the energy represented by the energy equation 4. Therefore, it is determined that a Y error has occurred on the data qubit 5a and a Z error has occurred on the data qubit 5b.

In the manner described above, it is possible to identify Y errors with a high probability. In addition, since the probability of identifying Y errors is increased, the success probability of identifying error locations correctly is increased accordingly. Assume, for example, that the Z error, X error, and Y error each have an occurrence rate of approximately 10% without any big difference. In such a case, a pattern in which two errors occur as in the second error detection pattern is more likely to happen than a pattern in which three errors occur at locations close to each other as in the first error detection pattern. If the occurrence rate of each error type decreases, the second error detection pattern with fewer errors in total is more likely to be a correct pattern.

In this connection, in the third energy term 4c, a coefficient of controlling an energy reduction amount may be set corresponding to each of the plurality of data qubits 5. In this case, the processing unit 12 computes the value of the coefficient for each of the plurality of data qubits 5 on the basis of the states of the first ancilla qubits and second ancilla qubits adjacent to the data qubit.

For example, assume now that the first state data 2 indicates whether the state of each of the plurality of first ancilla qubits 6 has flipped from the initial state. Likewise, assume that the second state data 3 indicates whether the state of each of the plurality of second ancilla qubits 7 has flipped from the initial state. The processing unit 12 determines whether the following two conditions are satisfied. The first condition is that at least one state of the first ancilla qubits adjacent to one data qubit has flipped from the initial state. The second condition is that at least one state of the second ancilla qubits adjacent to the one data qubit has flipped from the initial state. In the case where these two conditions are both satisfied, the processing unit 12 sets the coefficient for the one data qubit to a higher value than the other cases.

Since the coefficient is set for each of the plurality of data qubits 5 in this way, a higher value may be set as the coefficient for a data qubit that is more likely to have had a Y error, so as to increase the energy reduction amount in the third energy term 4c. As a result, the success probability of identifying the locations of Y errors correctly is increased.

In this connection, the processing unit 12 is able to determine the combination of first data qubits and second data qubits that further reduces the energy, using dedicated hardware. For example, the processing unit 12 sends coefficient data indicating the value of the coefficient for each of the plurality of data qubits 5, the first state data 2, and the second state data 3 to an Ising machine. Then, the processing unit 12 causes the Ising machine to find the combination of first data qubits and second data qubits that further reduces the energy represented by the energy equation 4. The Ising machine is able to solve a combinatorial optimization problem at a high speed. Therefore, the use of the Ising machine for finding the combination of first data qubits and second data qubits that further reduces the energy achieves high-speed error detection.

Second Embodiment

A second embodiment relates to a computer system that is able to correct errors including Y errors in the course of quantum computation.

Figure 2:
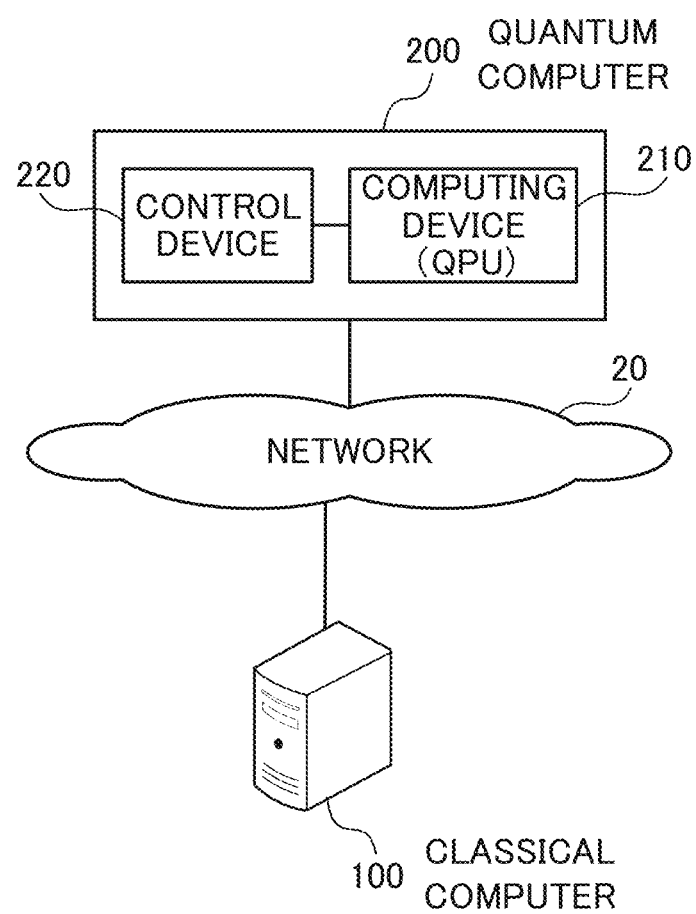
FIG. 2 illustrates an example of a system configuration.

FIG. 2 illustrates an example of a system configuration. For example, a quantum computer 200 and a classical computer 100 are connected to each other over a network 20. The quantum computer 200 includes a computing device 210 and a control device 220. The computing device 210 performs quantum computation using a quantum processing unit (QPU) housed in a refrigerator. The control device 220 instructs the computing device 210 to perform the quantum computation according to a given quantum circuit.

The classical computer 100 instructs the quantum computer 200 to perform computation according to the quantum circuit. The classical computer 100 is a so-called von Neumann machine. For example, the classical computer 100 sends a quantum circuit specified by a user to the quantum computer 200 and receives a computation result from the quantum computer 200.

In this connection, the classical computer 100 and quantum computer 200 perform error correction in a surface code in collaboration with each other. For example, the control device 220 uses part of the QPU as ancilla qubits, and periodically measures the states of the ancilla qubits for error detection in the surface code. The control device 220 sends information indicating the measured states of the ancilla qubits to the classical computer 100. The classical computer 100 detects qubits with errors on the basis of the states of the ancilla qubits. When detecting an error, the classical computer 100 instructs the quantum computer 200 to perform error correction on the qubit with the error.

Figure 3:
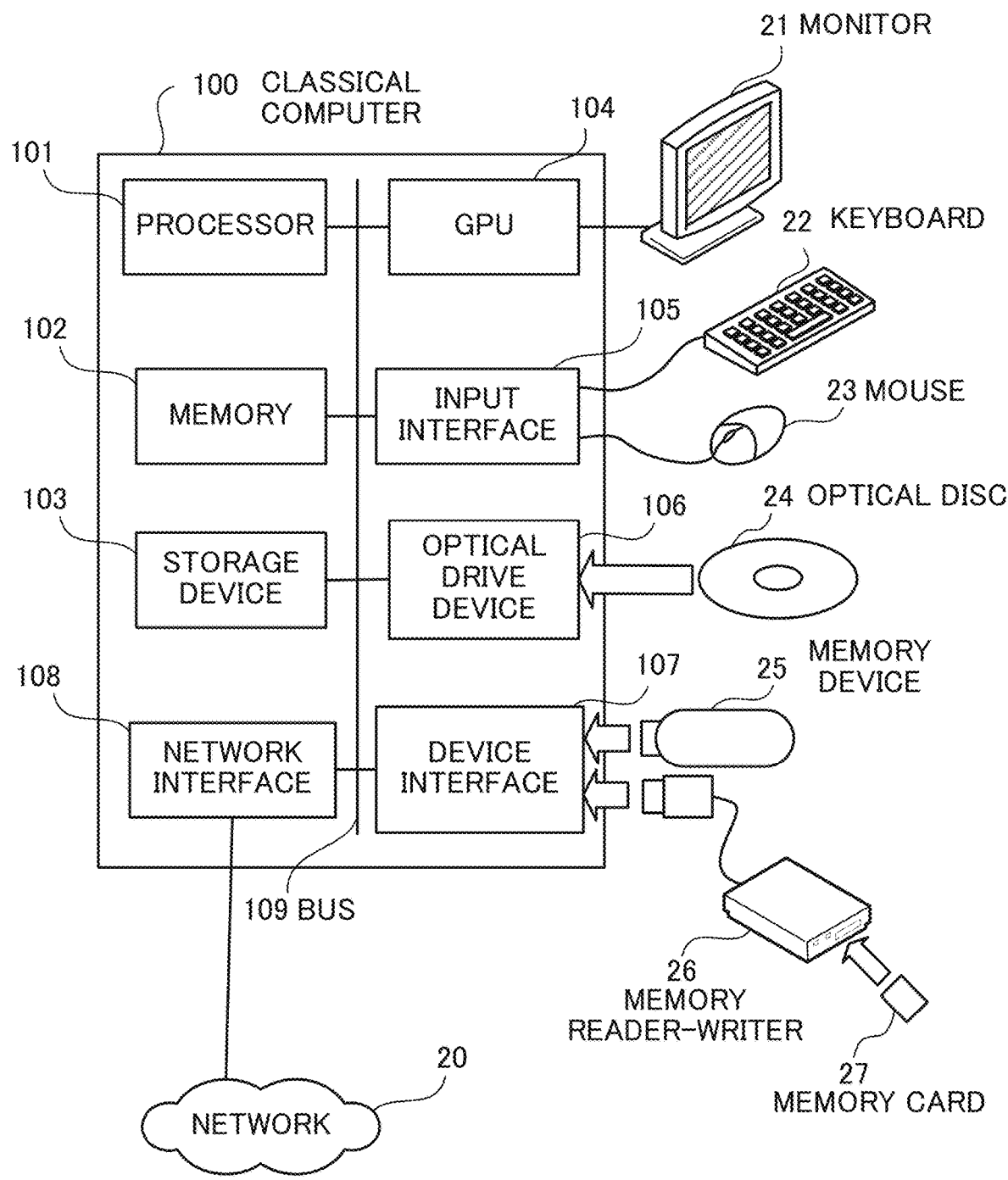
FIG. 3 illustrates an example of the hardware configuration of a classical computer.

FIG. 3 illustrates an example of the hardware configuration of the classical computer. The classical computer 100 is entirely controlled by a processor 101. A memory 102 and a plurality of peripheral devices are connected to the processor 101 with a bus 109. The processor 101 may be a multiprocessor. For example, the processor 101 may be a central processing unit (CPU), a micro processing unit (MPU), or a digital signal processor (DSP). At least some of functions implemented by the processor 101 running programs may be implemented by using an electronic circuit such as an application specific integrated circuit (ASIC) or a programmable logic device (PLD). PLDs include field-programmable gate arrays (FPGAs).

The memory 102 serves as a primary storage device of the classical computer 100. The memory 102 temporarily stores therein at least part of operating system (OS) programs and application programs that the processor 101 runs. The memory 102 also stores therein various data that the processor 101 uses in its processing. For example, a random access memory (RAM) or another volatile semiconductor storage device may be used as the memory 102.

The peripheral devices connected to the bus 109 include a storage device 103, a graphics processing device (GPU) 104, an input interface 105, an optical drive device 106, a device interface 107, and a network interface 108.

The storage device 103 writes and reads data electrically or magnetically on a built-in storage medium. The storage device 103 serves as a secondary storage device of the classical computer 100. The storage device 103 stores therein the OS programs, application programs, and various data. For example, a hard disk drive (HDD) or a solid state drive (SSD) may be used as the storage device 103.

The GPU 104 is a computing device that performs image processing, and may be called a graphics controller. A monitor 21 is connected to the GPU 104. The GPU 104 displays images on the monitor 21 in accordance with commands from the processor 101. The monitor 21 may be an organic electro-luminescence (EL) display device, a liquid crystal display device, or another.

A keyboard 22 and a mouse 23 are connected to the input interface 105. The input interface 105 supplies signals from the keyboard 22 and mouse 23 to the processor 101. The mouse 23 is an example of a pointing device, and another pointing device may be used. Other pointing devices include a touch panel, a tablet, a touchpad, a trackball, and others.

The optical drive device 106 performs data read and write on an optical disc 24 by using laser light or the like. The optical disc 24 is a portable storage medium on which data is recorded such as to be readable with reflection of light. The optical disc 24 may be a digital versatile disc (DVD), DVD-RAM, compact disc read-only memory (CD-ROM), CD-Recordable (CD-R), CD-Rewritable (CD-RW), or another.

The device interface 107 is a communication interface to connect peripheral devices to the classical computer 100. For example, the device interface 107 allows connections from a memory device 25 and a memory reader-writer 26. The memory device 25 is a storage medium having a function of communicating with the device interface 107. The memory reader-writer 26 is used to perform data read and write on a memory card 27 that is a card-type storage medium.

The network interface 108 is connected to the network 20. The network interface 108 communicates data with other computers and communication devices over the network 20. For example, the network interface 108 is a wired communication interface that is connected to a wired communication device such as a switch or a router with a cable. Alternatively, the network interface 108 may be a wireless communication interface that is connected to a wireless communication device such as a base station or an access point with radio waves.

The classical computer 100 with the above hardware configuration is able to implement the processing functions of the second embodiment. In this connection, the information processing apparatus 10 of the first embodiment may be configured with the same hardware as the classical computer 100 illustrated in FIG. 3.

The classical computer 100 implements the processing functions of the second embodiment by, for example, running programs stored in a computer-readable storage medium. The programs describing the processing functions to be executed by the classical computer 100 may be stored in a variety of storage media. For example, the programs that run on the classical computer 100 may be stored in the storage device 103. The processor 101 loads at least part of a program from the storage device 103 into the memory 102 and runs the loaded program. The programs that run on the classical computer 100 may be stored in the optical disc 24, memory device 25, memory card 27, or another portable storage medium. The programs stored in such a portable storage medium are installed in the storage device 103 under the control of the processor 101, so that they are ready to run. In addition, the processor 101 is able to run the programs while reading the programs directly from the portable storage medium.

Before describing quantum computation involving error correction in a surface code, the following describes how a quantum computer performs error correction in the surface code and why a logical error occurs, with reference to FIGS. 4 to 16.

Figure 4:
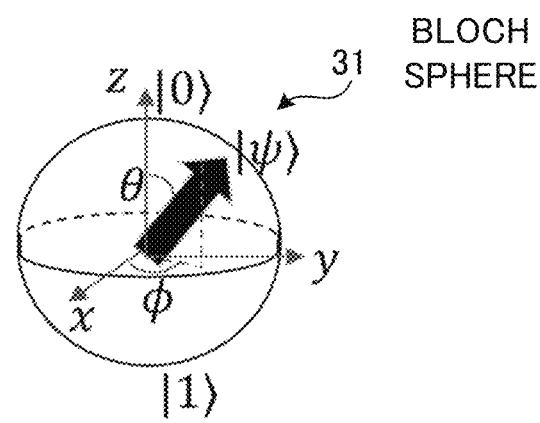
FIG. 4 is a view for describing a qubit.

FIG. 4 is a view for describing a qubit. A qubit is the minimum unit of quantum information, which corresponds to the minimum unit "bit" (classical bit) of an information amount in conventional computers. A qubit is in a quantum mechanical superposition state (quantum state) of "0" and "1." Mathematically, the quantum state of a qubit is represented by a two-dimensional vector given by equation (1), where "0>" and "1>" respectively correspond to the classical bits "0" and "1."

$$|\psi\rangle = \alpha|0\rangle + \beta|1\rangle \quad (1)$$

$$(\alpha, \beta: \text{COMPLEX NUMBERS}, |0\rangle = \begin{pmatrix} 1 \\ 0 \end{pmatrix}, |1\rangle = \begin{pmatrix} 0 \\ 1 \end{pmatrix})$$

Here, $\alpha$ and $\beta$ are complex numbers. By defining $\alpha$ and $\beta$ as in equation (2) using real numbers $\varphi$ and $\theta$ and an imaginary unit i, the qubit is represented by a Bloch sphere 31 illustrated in FIG. 4.

$$\alpha = \cos\left(\frac{\theta}{2}\right), \quad (2)$$

$$\beta = e^{i\phi}\sin\left(\frac{\theta}{2}\right)$$

A classical bit has a state of either "0" or "1" only. On the other hand, a qubit has a certain state on the Bloch sphere 31 surface. A quantum gate-type quantum computer is able to perform a desired computation by performing gate operations on qubits.

A gate operation changes a quantum state, and mathematically means applying a matrix operator to a vector representing the quantum state. An example of the gate operation is an X gate that flips the bit value of a qubit. The operation of the X gate is represented by the following equation.

MATRIX OPERATOR (3)

$$\begin{pmatrix} 0 & 1 \\ 1 & 0 \end{pmatrix}$$

CORRESPONDING TO BIT FLIP OPERATION $$(|0\rangle \rightarrow |1\rangle)$$

ON SINGLE QUBIT $$|0\rangle = \begin{pmatrix} 1 \\ 0 \end{pmatrix} \rightarrow \begin{pmatrix} 0 & 1 \\ 1 & 0 \end{pmatrix}\begin{pmatrix} 1 \\ 0 \end{pmatrix} = \begin{pmatrix} 0 \\ 1 \end{pmatrix} = |1\rangle$$

In addition, the operation of a Z gate that flips the phase of a qubit is represented by the following equation.

MATRIX OPERATOR (4)

$$\begin{pmatrix} 1 & 0 \\ 0 & -1 \end{pmatrix}$$

CORRESPONDING TO PHASE FLIP OPERATION $$(|+\rangle \rightarrow |-\rangle)$$

ON SINGLE QUBIT $$|+\rangle = \frac{1}{\sqrt{2}}\begin{pmatrix} 1 \\ 1 \end{pmatrix} \rightarrow \begin{pmatrix} 1 & 0 \\ 0 & -1 \end{pmatrix}\frac{1}{\sqrt{2}}\begin{pmatrix} 1 \\ 1 \end{pmatrix} = \frac{1}{\sqrt{2}}\begin{pmatrix} 1 \\ -1 \end{pmatrix} = |-\rangle$$

$$|+\rangle \equiv \frac{1}{\sqrt{2}}(|0\rangle + |1\rangle),$$

$$|-\rangle \equiv \frac{1}{\sqrt{2}}(|0\rangle - |1\rangle)$$

Matrix operators respectively corresponding to the X gate operation and Z gate operation are known as Pauli operators. The following three matrix operators are used as the Pauli operators.

$$\text{PAULI OPERATORS: } X = \begin{pmatrix} 0 & 1 \\ 1 & 0 \end{pmatrix}, Y = \begin{pmatrix} 0 & -i \\ i & 0 \end{pmatrix}, Z = \begin{pmatrix} 1 & 0 \\ 0 & -1 \end{pmatrix} \quad (5)$$

These Pauli operators have the following multiplication properties: XY=−YX, YZ=−ZY, and ZX=−XZ. Satisfaction of these relations means satisfaction of anticommutation relations. In addition, satisfaction of a relation without a minus sign (for example, a relation XI=IX with an identity operator I) means satisfaction of a commutation relation. The Pauli operators are in dependency relation with each other and satisfy a relation "Y=iXZ."

Other than the above operators, a Hadamard operator is used in gate operations. The Hadamard operator is used for a gate operation that generates a superposition state of "|0>" and "|1>." The Hadamard operator is represented by equation (6).

CHANGE STATE OF SINGLE QUBIT: (6)

$$|0\rangle \Leftrightarrow |+\rangle,$$

$$|1\rangle \Leftrightarrow |-\rangle$$

$$H = \frac{1}{\sqrt{2}}\begin{pmatrix} 1 & 1 \\ 1 & -1 \end{pmatrix}$$

The above matrix operators each act on a single qubit. On the other hand, there is an operator that acts on two qubits.

The state of two qubits is represented by a tensor product "|a⟩⊗|b⟩" (⊗ denotes a tensor product) of single-qubit states and is generally written as |ab⟩. This is a four (=2×2)-dimensional vector. An example of the matrix operator that acts on two qubits is a CNOT operator.

If the first qubit (control qubit) of two qubits is one, the CNOT operator flips the bit value of the second qubit (target qubit) (|10⟩→|11⟩). Since the state of the two qubits is a four-dimensional vector, the corresponding matrix operator is a matrix of dimensions 4×4. The CNOT operator is represented by the following equation.

$$C_x = \begin{pmatrix} 1 & 0 & 0 & 0 \\ 0 & 1 & 0 & 0 \\ 0 & 0 & 0 & 1 \\ 0 & 0 & 1 & 0 \end{pmatrix} \quad (7)$$

$$|10\rangle = \begin{pmatrix} 0 \\ 0 \\ 1 \\ 0 \end{pmatrix} \rightarrow \begin{pmatrix} 1 & 0 & 0 & 0 \\ 0 & 1 & 0 & 0 \\ 0 & 0 & 0 & 1 \\ 0 & 0 & 1 & 0 \end{pmatrix} \begin{pmatrix} 0 \\ 0 \\ 1 \\ 0 \end{pmatrix} = \begin{pmatrix} 0 \\ 0 \\ 0 \\ 1 \end{pmatrix} = |11\rangle$$

A quantum circuit is used for collectively representing gate operations that act on a plurality of qubits. In the quantum circuit, the state transitions of each qubit are represented by a line, and each gate operation is represented by a corresponding symbol.

Figure 5:
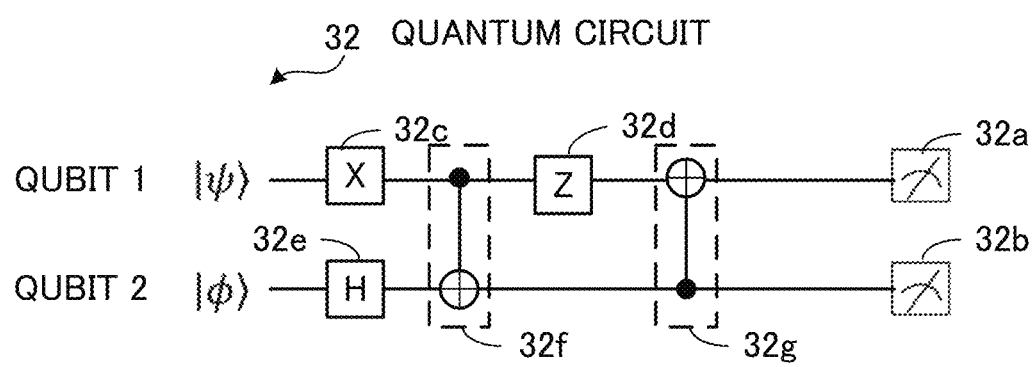
FIG. 5 illustrates an example of a quantum circuit.

FIG. 5 illustrates an example of a quantum circuit. Each horizontal line in a quantum circuit 32 corresponds to a qubit. An input to a qubit is indicated on the left side of the corresponding horizontal line. On each horizontal line, symbols representing gate operations on the corresponding qubit are arranged in chronological order in the horizontal direction (from left to right). Meter symbols 32a and 32b at the right ends of the horizontal lines represent a measurement operation.

For example, among the gate operations included in the quantum circuit 32, an X symbol 32c in a rectangular box represents a Pauli operator "X" (X gate operation). A Z symbol 32d in a rectangular box represents a Pauli operator "Z" (Z gate operation). An H symbol 32e in a rectangular box represents a Hadamard operator "H" (Hadamard gate operation).

A gate operation that acts on two qubits is represented by a line straddling a plurality of horizontal lines. For example, symbols 32f and 32g representing gate operations corresponding to a CNOT operator $C_x$ are each formed of a white circle with a plus sign and a black circle connected to each other. A black circle is placed on the horizontal line of a control qubit, and a white circle with a plus sign is placed on the horizontal line of a target qubit.

For example, the quantum circuit 32 illustrated in FIG. 5 represents performing gate operations "$C_{X(2,1)}Z_{(1)}C_{X(1,2)}H_{(2)}X_{(1)}$" on two qubits in a state |ψφ⟩. An expression representing such gate operations includes matrix operators that are applied in order from right to left. A subscript at the lower right of a matrix operator denotes the number of a qubit on which the matrix operator acts.

The quantum computer performs the gate operations represented by the quantum circuit 32 in order. At this time, there is a possibility that errors occur on qubits. To obtain a correct computation result, it is important to detect the occurrence of the errors and correct the errors.

Figure 6:
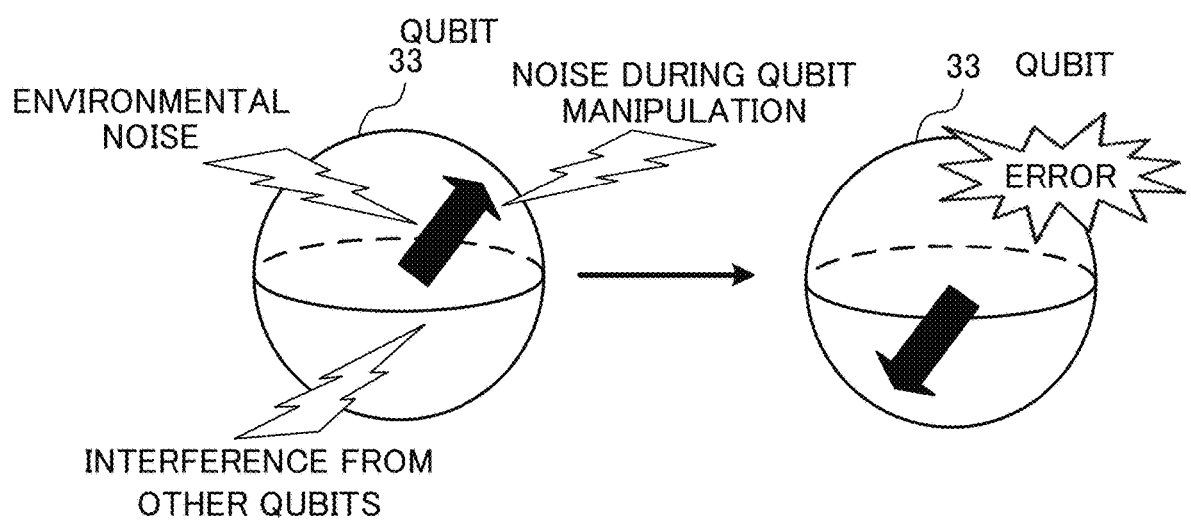
FIG. 6 illustrates an example of error-causing situations in a qubit.

FIG. 6 illustrates an example of error-causing situations in a qubit. A qubit 33 is affected by a variety of noise. Noise types include environmental noise, noise during qubit manipulation, and interference from other qubits. There is a possibility that the state of the qubit 33 is changed unintentionally due to effects of noise. Such an unintentional state change of a qubit is an error on the qubit. Errors that are directly detectable among errors that occur on qubits are classified into the following two types:

Bit flip error (X error): |0⟩→|1⟩, |1⟩→|0⟩
Phase flip error (Z error): |+⟩→|−⟩, |−⟩→|+⟩

Mathematically, the bit flip error is equivalent to applying the Pauli operator X to a quantum state. Similarly, the phase flip error is equivalent to applying the Pauli operator Z to a quantum state.

That is, an error on a qubit is correctable by applying the same Pauli operator (X, Z) as the error to the qubit. This operation is called a quantum error correction. Assume now, for example, the case of correcting an X error occurring on a qubit with the Pauli operator X. The X error is described by equation (8), and the gate operation for the correction is represented by equation (9).

$$X \text{ ERROR: } \begin{pmatrix} 1 \\ 0 \end{pmatrix} \rightarrow \begin{pmatrix} 0 \\ 1 \end{pmatrix} \quad (8)$$

$$\text{CORRECTION: } \begin{pmatrix} 0 \\ 1 \end{pmatrix} \rightarrow X \begin{pmatrix} 0 \\ 1 \end{pmatrix} = \begin{pmatrix} 0 & 1 \\ 1 & 0 \end{pmatrix} \begin{pmatrix} 0 \\ 1 \end{pmatrix} = \begin{pmatrix} 1 \\ 0 \end{pmatrix} \quad (9)$$

Through the error occurrence and correction, the quantum state changes like "|0⟩→|1⟩→|0⟩." To perform such error correction, a qubit (error qubit) with an error and the type of the error (bit flip (X error) or phase flip (Z error)) need to be identified. For identifying an error qubit and the type of the error, qubit redundancy is performed.

Figure 7:
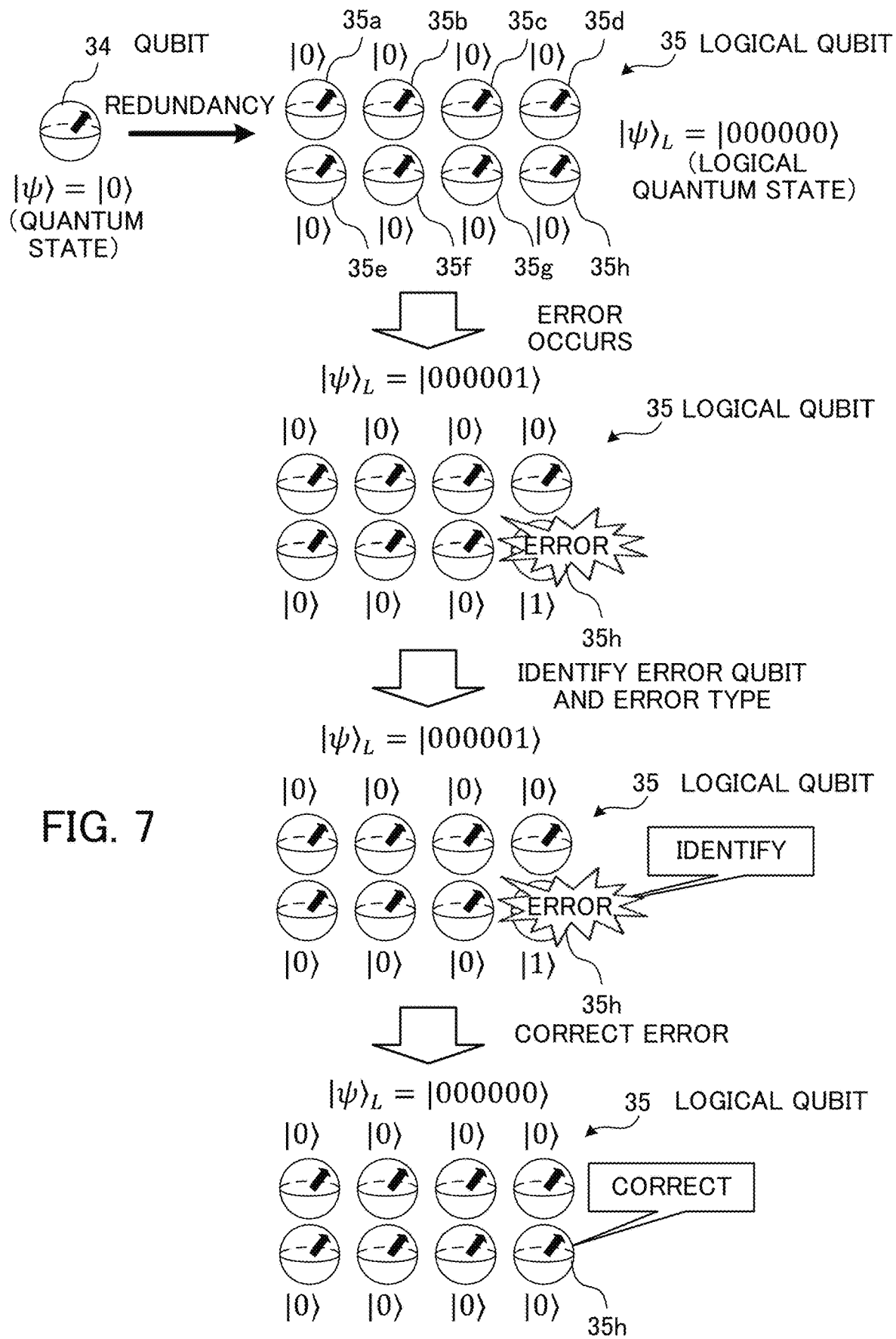
FIG. 7 illustrates an example of qubit redundancy.

FIG. 7 illustrates an example of qubit redundancy. FIG. 7 illustrates an example of redundancy using eight qubits. When the qubit redundancy is performed, a quantum state |ψ⟩ that is represented by one qubit 34 is represented as a logical quantum state |ψ⟩$_L$ by a logical qubit 35. The logical qubit 35 is made up of a plurality of qubits 35a to 35h.

Assume now that an error has occurred on one qubit 35h of the qubits forming the logical qubit 35. In this case, the error qubit and error type are identified through a process of identifying an error qubit and error type.

In the case where the qubit 35h is correctly identified as an error qubit and the error type is also correctly identified, a gate operation for error correction is performed on the qubit 35h. Through the error correction, the state of the logical qubit 35 is corrected to an error-free state.

FIG. 7 illustrates an example in which the error qubit is correctly identified. However, it is not easy to identify an error qubit. To identify an error qubit, information on the states of the qubits 35a to 35h forming the logical qubit 35 is used. However, direct measurement of a qubit breaks the quantum state, which renders the subsequent computation useless. To avoid this, ancilla qubits are introduced. By measuring the states of the ancilla qubits, information on the states of the qubits 35a to 35h forming the logical qubit 35 is obtained.

Figure 8:
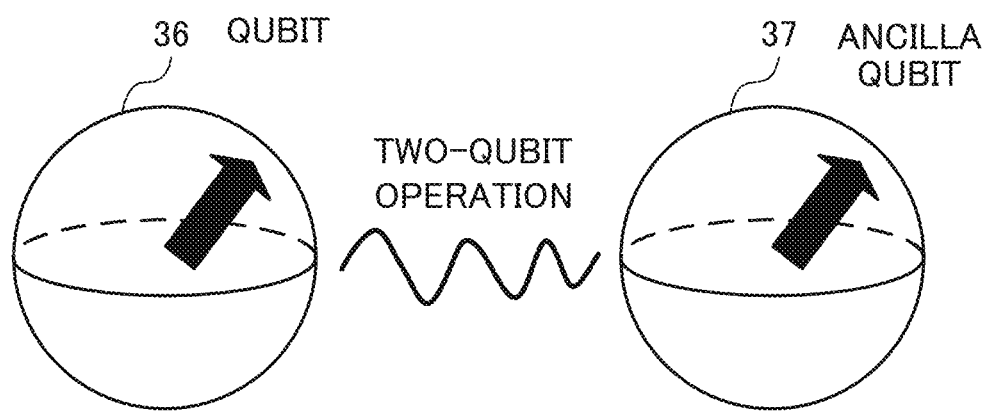
FIG. 8 illustrates an example of measurement using an ancilla qubit.

FIG. 8 illustrates an example of measurement using an ancilla qubit. It is not possible to copy the state of a qubit 36 to an ancilla qubit 37. Therefore, a two-qubit operation is performed on the qubit 36 and ancilla qubit 37. The two-qubit operation changes the state of the ancilla qubit 37 according to the state of the qubit 36. Then, the state of the ancilla qubit 37 is measured to detect a change in the state of the ancilla qubit 37 from the initial state. By determining whether the state of the ancilla qubit 37 has changed from the initial state, it is possible to obtain the state of the qubit 36.

Surface code is a method of identifying error qubits on the basis of the states of qubits obtained using ancilla qubits. The surface code is a representative encoding (redundancy) approach in quantum error correction.

Figure 9:
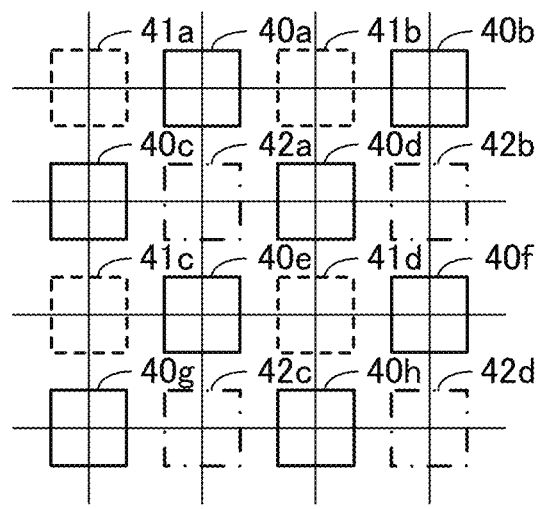
FIG. 9 illustrates an example of the arrangement of qubits for implementing a surface code.
Figure 9:
Figure 9:

FIG. 9 illustrates an example of the arrangement of qubits for implementing a surface code. Referring to the example of FIG. 9, qubits are arranged in a two-dimensional lattice. Data qubits 40a to 40h and ancilla qubits 41a to 41d and 42a to 42d are alternately arranged both in the row direction and in the column direction. The ancilla qubits 41a to 41d and 42a to 42d are classified into the ancilla qubits 41a to 41d used for X error detection and the ancilla qubits 42a to 42d used for Z error detection. In addition, the ancilla qubits 41a to 41d for X error detection and the ancilla qubits 42a to 42d for Z error detection are alternately arranged column by column.

In this connection, the qubits illustrated in FIG. 9 are some of qubits used for error correction in the surface code. In the case of performing the error correction in the surface code, the number of qubits (the total number of data qubits and ancilla qubits) arranged in one dimension of a two-dimensional lattice including all qubits used for the error correction of one logical qubit is odd, and data qubits are arranged at the four corners (see FIG. 13). In this connection, one logical qubit is made up of all data qubits arranged in the corresponding two-dimensional lattice.

The quantum computer 200 first initializes the logical quantum state properly, and in error detection, performs gate operations (two-qubit operations) between one ancilla qubit and its neighboring four data qubits, and measures the ancilla qubit. The classical computer 100 is able to detect whether an error has occurred, based on the result of measuring the ancilla qubit.

Figure 10:
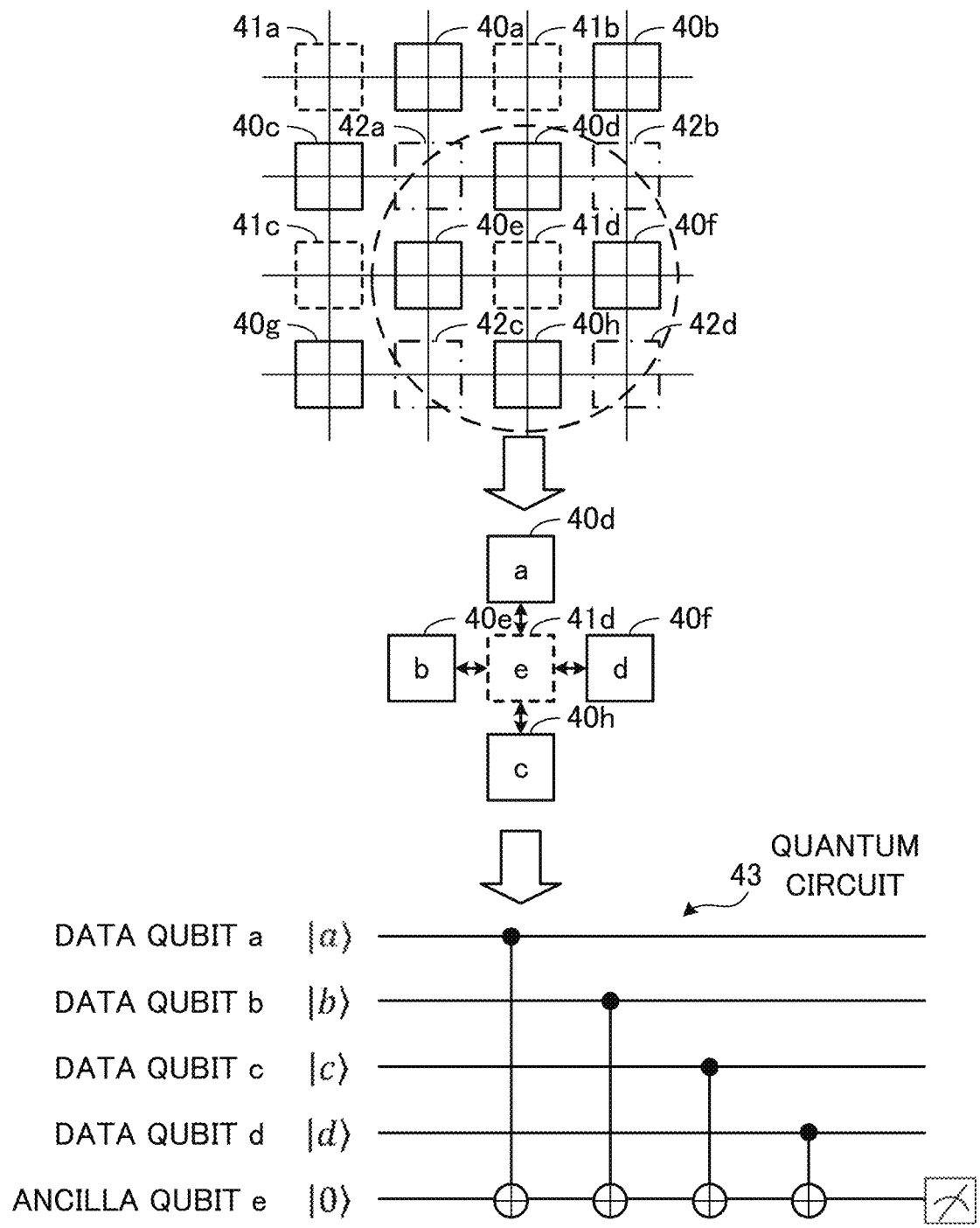
FIG. 10 illustrates an example of gate operations for X error detection.

FIG. 10 illustrates an example of gate operations for X error detection. For example, assume the case of detecting, using the ancilla qubit 41d, an error occurring on any of the data qubits 40d, 40e, 40h, and 40f adjacent to the ancilla qubit 41d. Assume now that the data qubit 40d has an identifier "a," the data qubit 40e has an identifier "b," the data qubit 40h has an identifier "c," the data qubit 40f has an identifier "d," and the ancilla qubit 41d has an identifier "e."

The gate operations represented by a quantum circuit 43 are performed on these qubits, so as to detect an X error on the data qubits 40d, 40e, 40h, and 40f. The quantum circuit 43 indicates that the CNOT gate operation is performed with each of the data qubits 40d, 40e, 40h, and 40f as a control qubit and the ancilla qubit 41d as a target qubit. In the case where an X error has occurred on one of the data qubits 40d, 40e, 40h, and 40f, the gate operations change the state of the ancilla qubit 41d from the initial state. Referring to the example of FIG. 10, the ancilla qubit 41d has an initial state |0>. Therefore, if the state |1> is detected by a Z-basis measurement (in view of whether the quantum state is |0> or |1>) of the ancilla qubit 41d, an X error is determined to have occurred on any of the data qubits 40d, 40e, 40h, and 40f.

Figure 11:
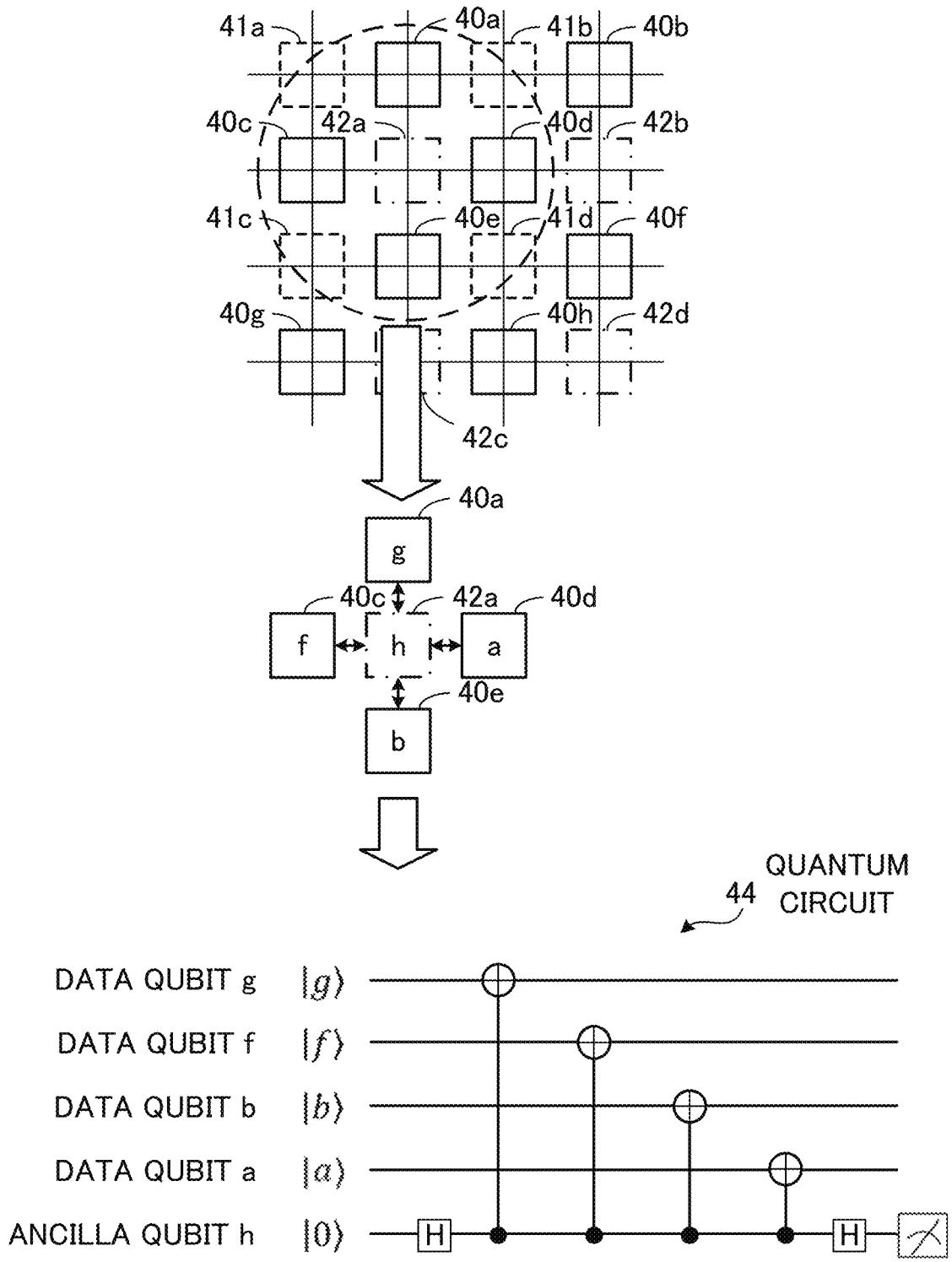
FIG. 11 illustrates an example of gate operations for Z error detection.

FIG. 11 illustrates an example of gate operations for Z error detection. For example, assume now the case of detecting, using the ancilla qubit 42a, an error occurring on any of the data qubits 40a, 40c, 40d, and 40e adjacent to the ancilla qubit 42a. Assume also that the data qubit 40a has an identifier "g," the data qubit 40c has an identifier "f," and the ancilla qubit 42a has an identifier "h." In addition, as in the case of FIG. 10, the data qubit 40d has an identifier "a," and the data qubit 40e has an identifier "b."

The gate operations represented by a quantum circuit 44 are performed on these qubits, so as to detect a Z error on the data qubits 40a, 40c, 40d, and 40e. The quantum circuit 44 indicates that a Hadamard gate operation is first performed on the ancilla qubit 42a. After that, the CNOT gate operation is performed with each of the data qubits 40a, 40c, 40d, and 40e as a target qubit and the ancilla qubit 42a as a control qubit. In addition, the Hadamard gate operation is performed on the ancilla qubit 42a. In this connection, in the situation represented by the quantum circuit 44, the CNOT gate operation between a data qubit with a Z error and the ancilla qubit 42a changes the state of the ancilla qubit 42a that is a control qubit, according to the state of the target qubit.

In the case where a Z error has occurred on one of the data qubits 40a, 40c, 40d, and 40e, the gate operations change the state of the ancilla qubit 42a from the initial state. Referring to the example of FIG. 11, the ancilla qubit 42a has an initial state |0>. Therefore, if the state |1> is detected by the Z-basis measurement of the ancilla qubit 42a, a Z error is determined to have occurred on any of the data qubits 40a, 40c, 40d, and 40e.

The following describes the initialization of data qubits. If a logical quantum state $|\psi\rangle_L$ is arbitrarily determined, the gate operations for error detection illustrated in FIG. 10 or FIG. 11 may change the states of data qubits and an ancilla qubit even in the case where no error has occurred. To avoid such state changes, the logical quantum state $|\psi\rangle_L$ is initialized into the eigenstate (with eigenvalue +1 or −1) of a stabilizer operator. The stabilizer operator is the product of Z operators or X operators that act on the four data qubits neighboring an ancilla qubit.

For example, a stabilizer operator for X error detection illustrated in FIG. 10 is "$Z_{(i1)}Z_{(i2)}Z_{(i3)}Z_{(i4)}|\psi\rangle_L = \pm|\psi\rangle_L$," where i is the index of an ancilla qubit for the X error detection. The number on the right side of i specifies a data qubit neighboring the ancilla qubit. For example, the number "1" specifies a data qubit above the ancilla qubit, the number "2" specifies a data qubit on the left side of the ancilla qubit, the number "3" specifies a data qubit under the ancilla qubit, and the number "4" specifies a data qubit on the right side of the ancilla qubit. For example, $Z_{(i1)}$ indicates a Z operator that acts on the data qubit above the i-th ancilla qubit.

In addition, a stabilizer operator for Z error detection illustrated in FIG. 11 is "$X_{(j1)}X_{(j2)}X_{(j3)}X_{(j4)}|\psi\rangle_L = \pm|\psi\rangle_L$," where j is the index of an ancilla qubit for the Z error detection. The number on the right side of j specifies a data qubit neighboring the ancilla qubit.

After the logical quantum state $|\psi\rangle_L$ is initialized as described above, the measurement of the ancilla qubit does not affect the states of the qubits.

The following describes a method of error detection in a surface code. In the surface code, if an X error has occurred on one data qubit, the state $|\psi\rangle_L$ changes to an eigenstate $|\psi'\rangle_L$ of the stabilizer operator with a different eigenvalue.

Figure 12:
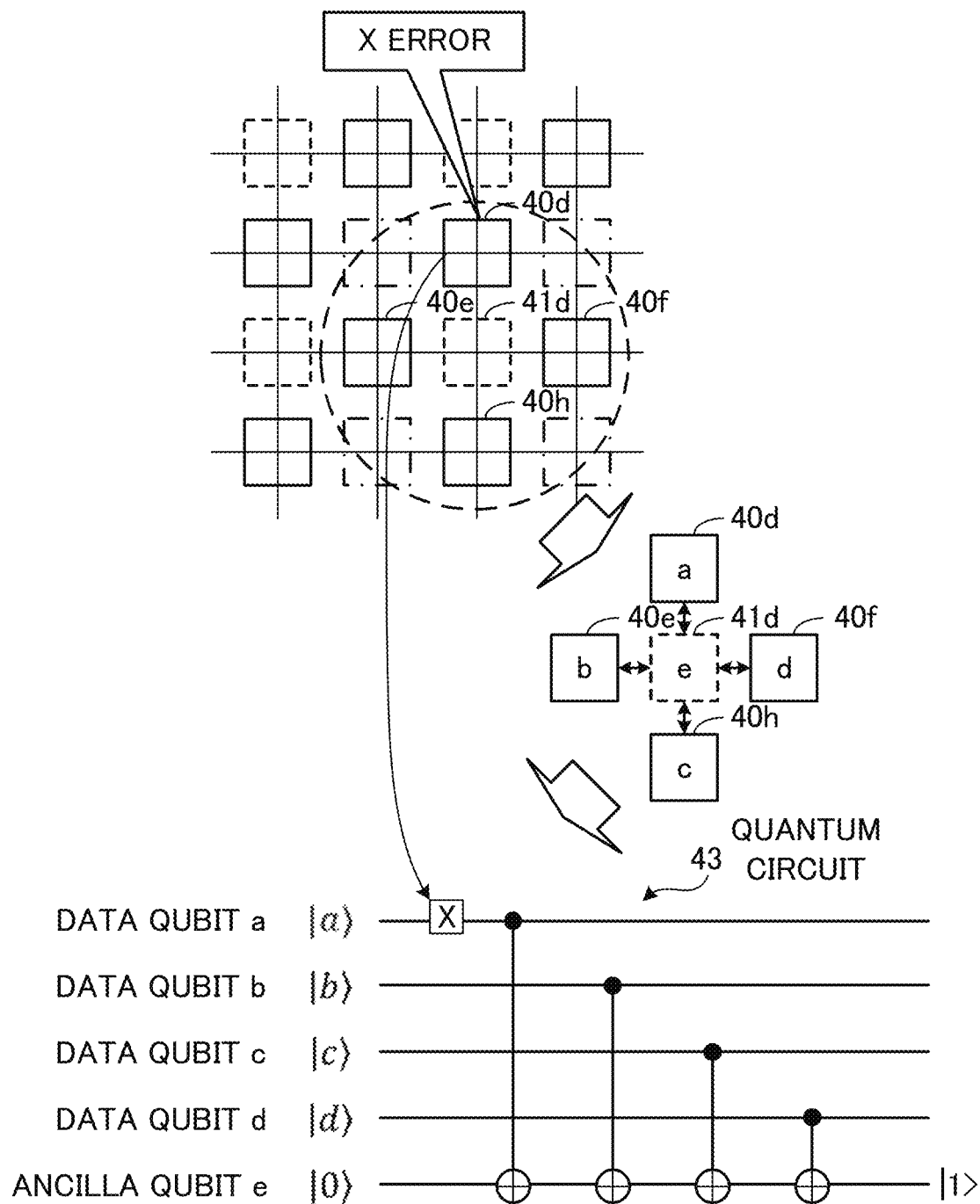
FIG. 12 illustrates an example of X error detection.

FIG. 12 illustrates an example of X error detection. For example, consider the case where $|\psi\rangle_L$ has an eigenvalue of +1. When an X error has occurred on one of the data qubits neighboring an i-th ancilla qubit, "$|\psi'\rangle_L = X_{(i1)}|\psi\rangle_L$" is obtained. Referring to the example of FIG. 12, the error has occurred on the data qubit 40d.

When the Z stabilizer operators around the ancilla qubit 41d are applied to the data qubit 40d with the error, "$Z(i1)Z(i2)Z(i3)Z(i4)|\psi'\rangle_L$" is obtained. This expression is deformed using the relation "$|\psi'\rangle_L = X_{(i1)}|\psi\rangle_L$" as follows.

$$Z_{(i1)}Z_{(i2)}Z_{(i3)}Z_{(i4)}|\psi\rangle_L=$$

$$Z_{(i1)}Z_{(i2)}Z_{(i3)}Z_{(i4)}X_{(i1)}|\psi\rangle_L=Z_{(i1)}X_{(i1)}Z_{(i2)}Z_{(i3)}Z_{(i4)}|\psi\rangle_L$$

Since the X operator and the Z operator satisfy an anticommutation relation (ZX=−XZ), this expression is further deformed as follows.

$$Z_{(i1)}X_{(i1)}Z_{(i2)}Z_{(i3)}Z_{(i4)}|\psi\rangle_L=$$

$$-X_{(i1)}Z_{(i1)}Z_{(i2)}Z_{(i3)}Z_{(i4)}|\psi\rangle_L=-X_{(i1)}|\psi\rangle_L=-|\psi\rangle_L$$

"$-|\psi\rangle_L$" indicates that the eigenvalue changes to "−1." Using the quantum circuit 43, this change of the eigenvalue is detected as a bit flip of the ancilla qubit 41d.

The measurement of an ancilla qubit in the manner described above makes it possible to detect an error occurring on one of the data qubits neighboring the ancilla qubit. However, the measurement of only one ancilla qubit does not identify on which data qubit neighboring the ancilla qubit the error has occurred. To overcome this, a data qubit with the error is identified on the basis of the positional relationship among two or more ancilla qubits from which errors are detected among a plurality of ancilla qubits.

Figure 13:
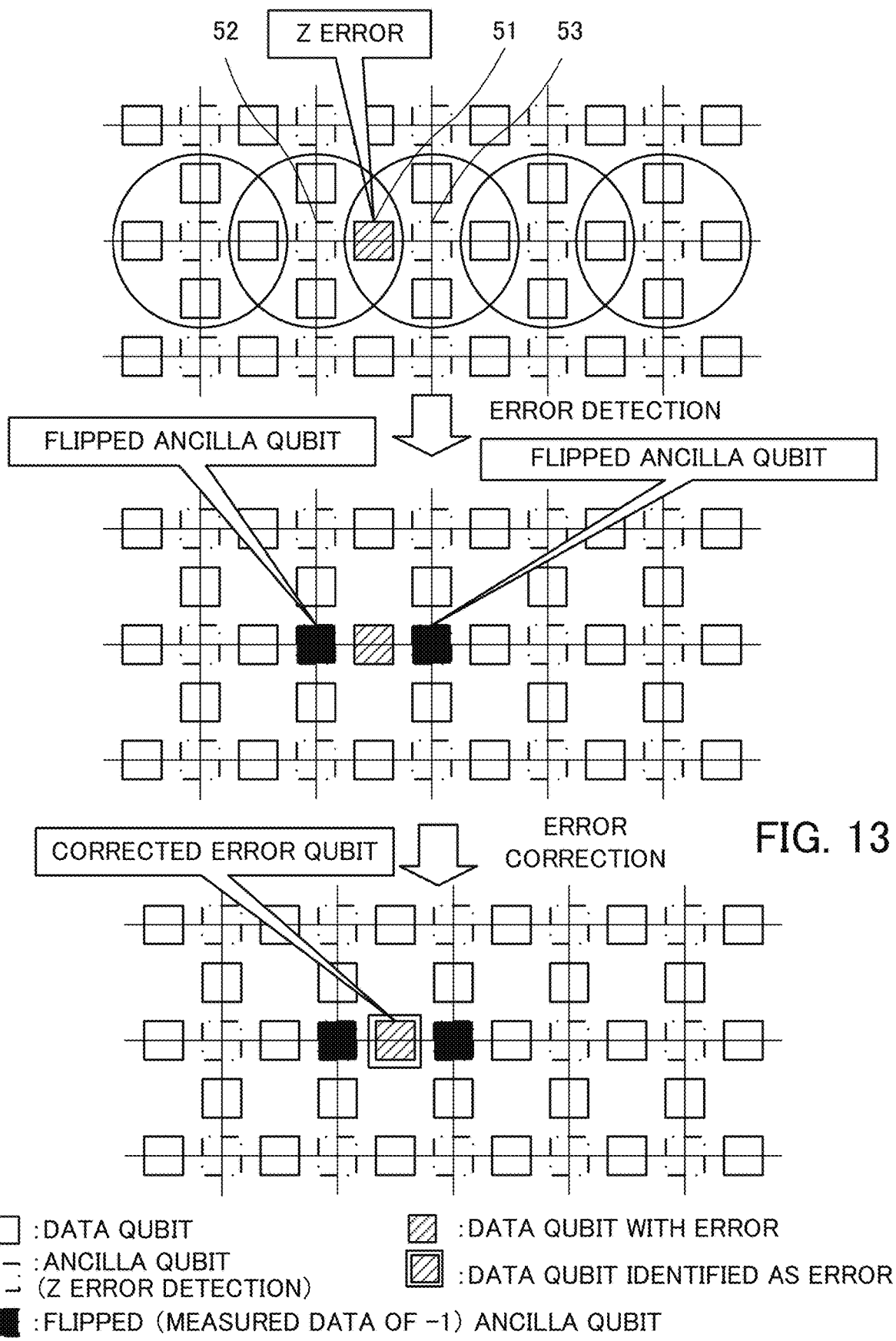
FIG. 13 illustrates an example of error location identification.

FIG. 13 illustrates an example of error location identification. Although FIG. 13 illustrates an example of identifying the location of a Z error, the location of an X error may be identified in the same manner. Note that ancilla qubits for X error detection among ancilla qubits are omitted in FIG. 13 (the same applies to FIGS. 14 to 16).

Assume now that a Z error has occurred on a data qubit 51. In the error detection process, the same gate operations as represented by the quantum circuit 44 illustrated in FIG. 11 are performed on all ancilla qubits, so that their states are measured. In FIG. 13, an ancilla qubit that is a target for a measurement and data qubits that are targets for the error detection based on the ancilla qubit are enclosed in a circle.

The data qubit 51 with the error is adjacent to two ancilla qubits 52 and 53 and is enclosed together with each ancilla qubit 52 and 53 in the same circle. In this case, through the measurements, it is detected that the states of the ancilla qubits 52 and 53 have been flipped. Since the states of the ancilla qubits 52 and 53 have been flipped, the data qubit 51 located between these ancilla qubits 52 and 53 is identified as an error location. Then, an error correction operation (a Z gate operation) is performed on the data qubit 51.

The classical computer 100 may be used to identify an error location on the basis of a result of measuring the states of ancilla qubits. If there is only one error location as illustrated in FIG. 13, the classical computer 100 is able to uniquely identify the error location. If there are many error qubits, however, the error location identification process becomes very complicated for the classical computer 100. One method of identifying error locations in a surface code is to solve an error location identification problem as an energy minimization problem of an Ising model.

Figure 14:
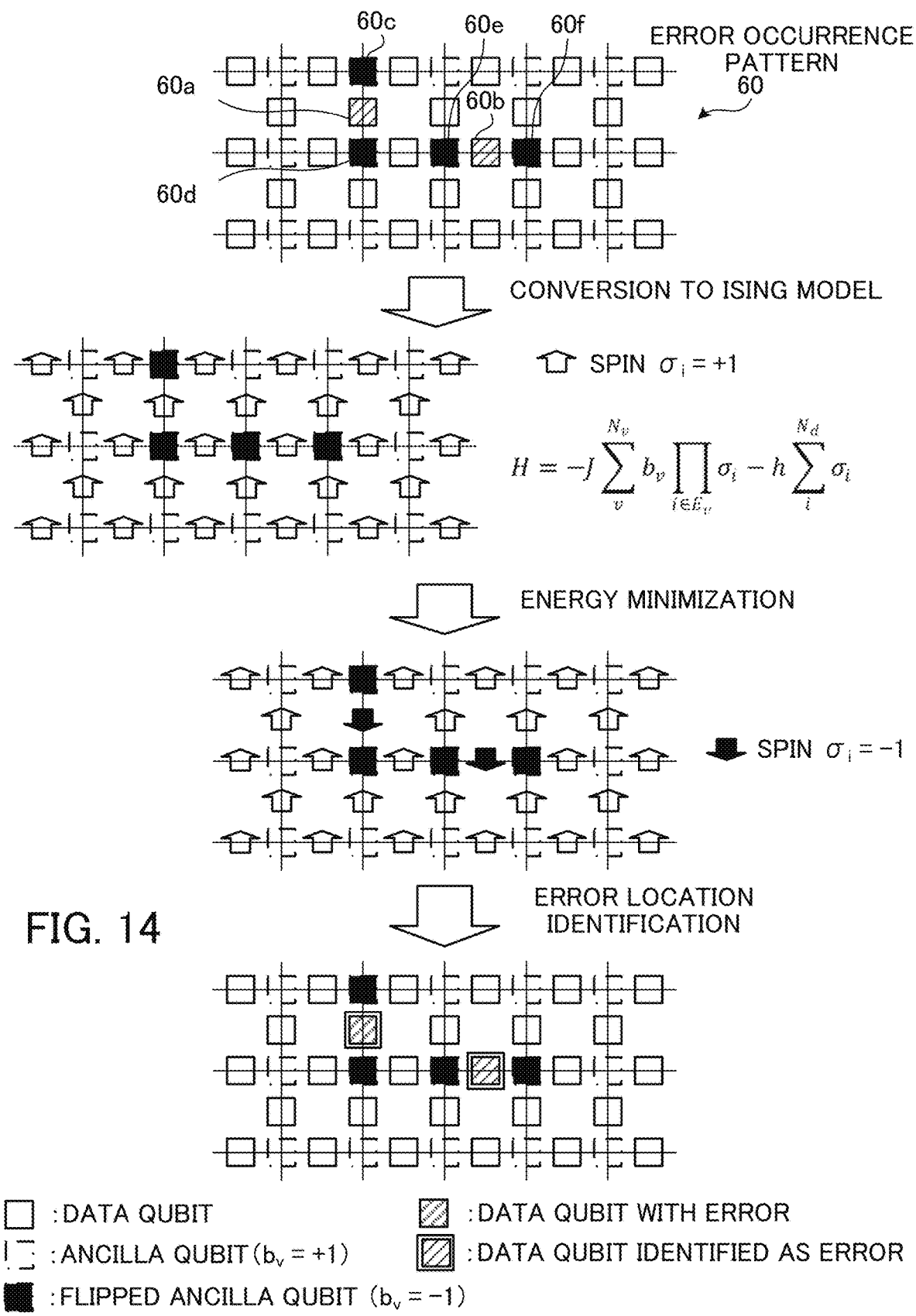
FIG. 14 illustrates an example of an error location identification method using an Ising model.

FIG. 14 illustrates an example of an error location identification method using an Ising model. The example illustrated in FIG. 14 relates to detecting Z errors using an Ising model. For example, assume that Z errors have occurred on two data qubits 60a and 60b, as indicated in an error occurrence pattern 60. In this case, by performing gate operations for Z error detection and measuring the states of ancilla qubits, it is detected that the states of ancilla qubits 60c to 60f for Z error detection neighboring the data qubits 60a and 60b have been flipped.

The classical computer 100 having received the result of measuring the ancilla qubits replaces the data qubits with spins of the Ising model. In addition, taking the ancilla qubits as lattice points, the classical computer 100 sets the measured data of the ancilla qubits at the lattice points. For example, if the state of the v-th ancilla qubit (v is a natural number) has not been flipped, the measured data $b_v$ at the lattice point corresponding to the v-th ancilla qubit is "+1." If the state of the v-th ancilla qubit has been flipped, on the other hand, the measured data $b_v$ at the lattice point corresponding to the v-th ancilla qubit is "−1."

At this time, the energy (Hamiltonian) of the Ising model for the Z error detection is represented by equation (10).

$$H = -J\sum_v^{N_v} b_v \prod_{i \in E_v} \sigma_i - h\sum_i^{N_d} \sigma_i \qquad (10)$$

Here, J and h are constant numbers (positive real numbers). $N_v$ denotes the number of lattice points. $E_v$ denotes a set of the indices of spins $\sigma_i$ adjacent to the v-th lattice point. $N_d$ denotes the number of spins. The spin $\sigma_i$ has a value of "+1" if it is not flipped (an upward arrow), and has a value of "−1" if it is flipped (a downward arrow) The classical computer 100 determines the directions of the spins that minimize the energy represented by equation (10). The classical computer 100 identifies, as error locations, the data qubits 60a and 60b corresponding to spins that are in a flipped state when the energy is minimized.

The first term on the right-hand side of equation (10) acts to reduce the overall energy if the measured data $b_v$ at the v-th lattice point is "+1" and the number of flipped spins ($\sigma_i$=−1) among the neighboring spins is even. In addition, the first term on the right-hand side acts to increase the overall energy if the measured data $b_v$ at the v-th lattice point is "−1" and the number of flipped spins ($\sigma_i$=−1) among the neighboring spins is odd.

The second term on the right-hand side of equation (10) acts to reduce the overall energy as the number of flipped spins decreases. The second term makes it possible to prevent the energy value from being minimized in a state where all spins are flipped, although no error has occurred, for example.

The error occurrence pattern 60 illustrated in FIG. 14 is an example in which it is possible to uniquely identify error locations. However, if the error locations are close to each other, the errors are less likely to be identified uniquely.

Figure 15:
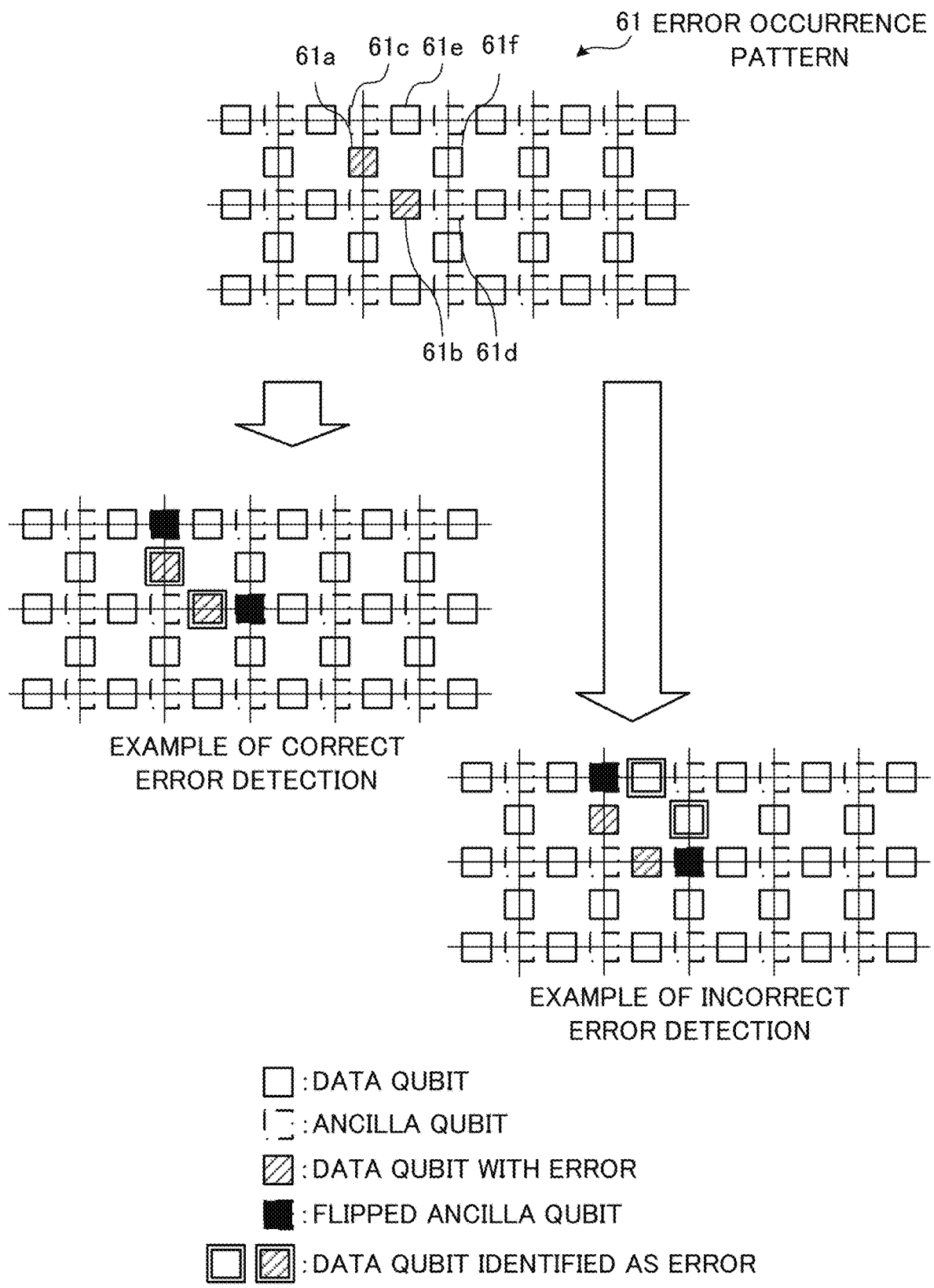
FIG. 15 illustrates an example of a situation in which it is not possible to uniquely identify error locations.

FIG. 15 illustrates an example of a situation in which it is not possible to uniquely identify error locations. An error occurrence pattern 61 illustrated in FIG. 15 indicates that errors have occurred on two data qubits 61a and 61b. These data qubits 61a and 61b are located on rows next to each other and on columns next to each other. In this case, in the error detection, the state of an ancilla qubit 61c directly above the data qubit 61a is flipped, and the state of an ancilla qubit 61d directly on the right side of the data qubit 61b is flipped.

In addition to the error occurrence pattern in which errors have occurred on the data qubits 61a and 61b (an example of correct error detection), there are other error occurrence patterns that cause the situation where the ancilla qubits 61c and 61d are flipped and the other ancilla qubits are not flipped. For example, there is a pattern in which errors have occurred on data qubits 61e and 61f. Therefore, there is a possibility of detecting that errors have occurred on the data qubits 61e and 61f (an example of incorrect error detection).

If there are a plurality of error occurrence patterns that are able to reproduce the states of the ancilla qubits in this manner, it is not possible to identify which of these error occurrence patterns is correct, on the basis of the measured data of the ancilla qubits. Therefore, there is a possibility of incorrectly identifying error locations as in the example of incorrect error detection. If error correction is performed on the basis of the incorrectly identified error locations thereafter, an error (logical error) may occur, which is not detectable through the measurements of the ancilla qubits.

Figure 16:
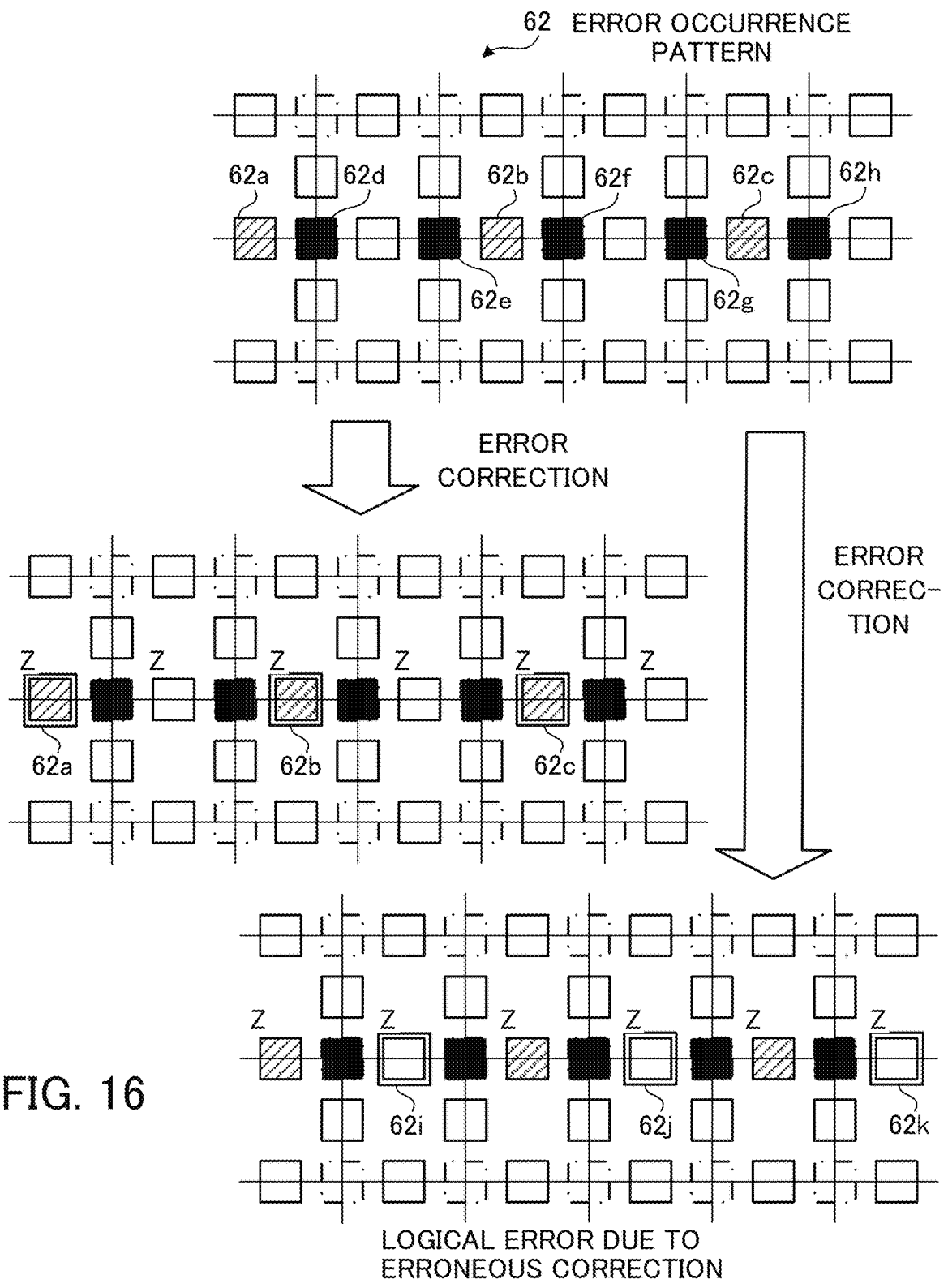
FIG. 16 illustrates an example of a logical error due to erroneous correction.

FIG. 16 illustrates an example of a logical error due to erroneous correction. An error occurrence pattern 62 illustrated in FIG. 16 relates to a case where there are six data qubits in one dimension and three errors have occurred, one on every other data qubit. For example, Z errors have occurred on data qubits 62a to 62c on the same row. In this case, the states of ancilla qubits 62d to 62h adjacent to any of the data qubits 62a to 62c on the same row are flipped.

In this case, there are two error detection patterns that are able to reproduce the measured data of the ancilla qubits. One error detection pattern is a pattern in which the data qubits 62a to 62c are correctly detected as error qubits. In this case, an error correction operation is performed on the data qubits 62a to 62c detected as the error qubits, so as to correct the occurring errors correctly.

The other error detection pattern is a pattern in which data qubits 62i to 62k different from the data qubits 62a to 62c with the errors are detected as error qubits. In the case where the data qubits 62i to 62k are detected as error qubits, the error correction operation is performed on the data qubits 62i to 62k. As a result, the error qubits or the data qubits that have been flipped by the erroneous correction are sequentially arranged from one boundary to its opposite boundary. This situation is called a logical error. In the situation where the logical error has occurred, the logical quantum state $|\psi\rangle_L$ has changed. Therefore, if the computation proceeds further, a correct result is not obtained.

As described above, there is a case of failing to correctly detect error locations even only for Z errors. The same is true for X errors. Furthermore, considering that Y errors also need to be corrected, accurate error detection is more complicated.

Figure 17:
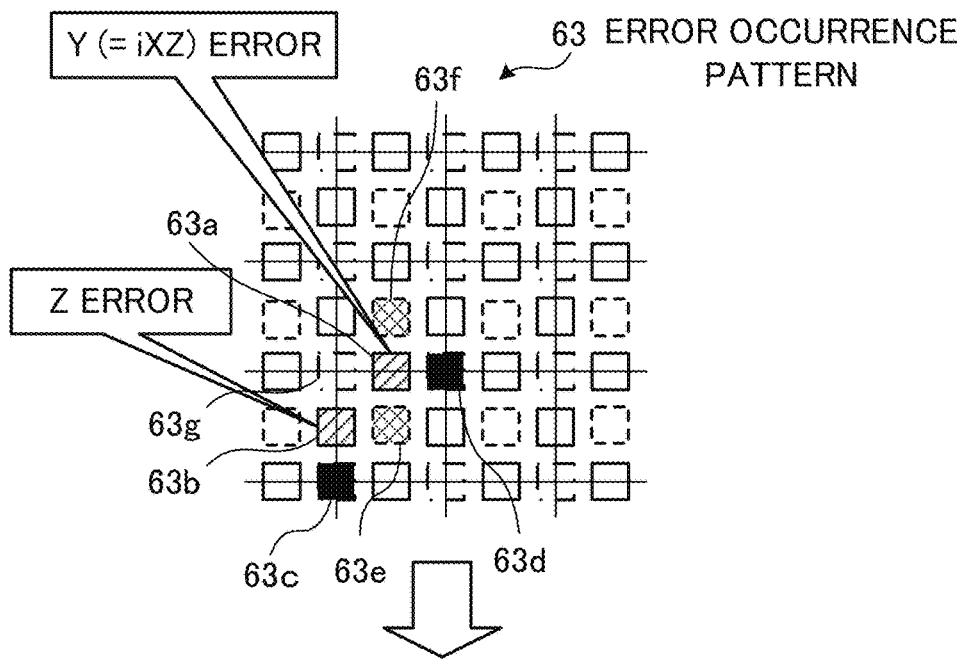
FIG. 17 illustrates an example of detecting errors including a Y error.
Figure 17:
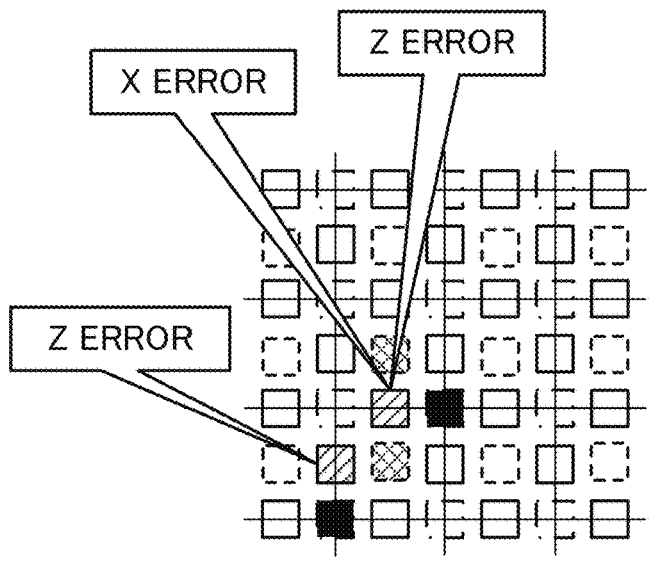

FIG. 17 illustrates an example of detecting errors including a Y error. The surface code detects X errors and Z errors on the basis of bit flips of ancilla qubits. Note that a Y error (mathematically, the action of the Pauli operator Y) may occur in the quantum computer 200. The Pauli operator Y and the Pauli operators X and Z have a relation Y=iXZ (i is an imaginary unit). In the surface code, there is no stabilizer operator for Y error detection. Therefore, the Y error is detected on the basis of a combination of Z error detection and X error detection. More specifically, a data qubit with a Y error is regarded as having both an X error and a Z error, and therefore a data qubit on which X and Z errors have occurred simultaneously is identified as the location of a Y error.

An error occurrence pattern 63 illustrated in FIG. 17 indicates that a Y error has occurred on a data qubit 63a and a Z error has occurred on a data qubit 63b. The data qubit 63a and data qubit 63b are located on rows next to each other and on columns next to each other. In this case, through the gate operations for Z error detection, the state of an ancilla qubit 63c for Z error detection adjacent to the data qubit 63b and the state of an ancilla qubit 63d for Z error detection adjacent to the data qubit 63a are flipped. In this connection, an ancilla qubit 63g is located adjacent to both the data qubits 63a and 63b with the errors, and therefore the state of the ancilla qubit 63g is not flipped. In addition, through the gate operations for X error detection, the states of ancilla qubits 63e and 63f for X error detection adjacent to the data qubit 63a are flipped.

Here, assume that the classical computer 100 detects Z errors occurring on the data qubits 63a and 63b on the basis of the states of the ancilla qubits 63c and 63d for Z error detection. In addition, the classical computer 100 is able to detect an X error occurring on the data qubit 63a on the basis of the states of the ancilla qubits 63e and 63f for X error detection. In this case, since both the Z error and the X error are detected on the data qubit 63a, the classical computer 100 determines that an error occurring on the data qubit 63a is a Y error.

As described above, it is possible to detect a Y error on the basis of a combination of the Z error detection and the X error detection. It is also possible to solve the problem of detecting errors including Y errors as an energy minimization problem of an Ising model.

Figure 18:
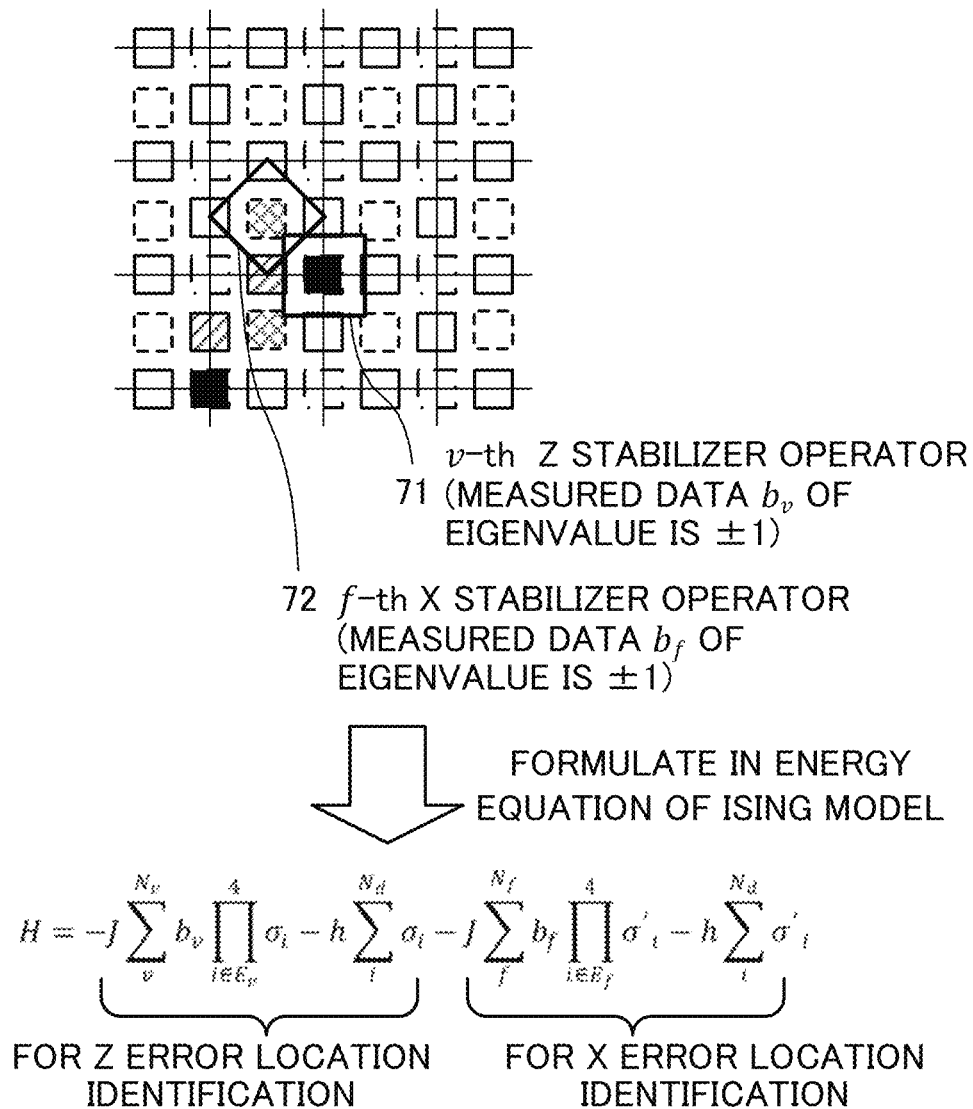
FIG. 18 illustrates an example of an Ising model that is able to perform Z error detection and X error detection.

FIG. 18 illustrates an example of an Ising model that is able to perform Z error detection and X error detection. For example, a stabilizer operator (v-th Z stabilizer operator 71) for Z error detection is defined corresponding to each ancilla qubit for Z error detection. The measured data $b_v$ of the eigenvalue of this stabilizer operator is +1 or −1. In addition, a stabilizer operator (f-th X stabilizer operator 72) for X error detection is defined corresponding each ancilla qubit for X error detection. The measured data $b_f$ of the eigenvalue of this stabilizer operator is +1 or −1.

For the error detection using these stabilizer operators, a spin variable $\sigma_i$ for Z error identification and a spin variable $\sigma'_i$ for X error identification are prepared for each data qubit. For example, the energy of the Ising model for this case is represented by equation (11).

$$H = -J \sum_v^{N_v} b_v \prod_{i \in E_v}^{4} \sigma_i - h \sum_i^{N_d} \sigma_i - J \sum_f^{N_f} b_f \prod_{i \in E_f}^{4} \sigma'_i - h \sum_i^{N_d} \sigma'_i \quad (11)$$

$N_v$ denotes the number of lattice points corresponding to the ancilla qubits for Z error detection. $E_v$ denotes a set of the indices of spin variables $\sigma_i$ adjacent to the v-th lattice point corresponding to an ancilla qubit for Z error detection. $N_f$ denotes the number of lattice points corresponding to the ancilla qubits for X error detection. $E_f$ denotes a set of the indices of spin variables $\sigma'_i$ adjacent to the f-th lattice point corresponding to an ancilla qubit for X error detection. $N_d$ denotes the number of spin variables $\sigma_i$ (which is equal to the number of spin variables $\sigma'_i$). The spin variables $\sigma_i$ and $\sigma'_i$ have an initial state of "+1."

The first and second terms on the right-hand side of equation (11) is to compute the energy for identifying Z error locations. In addition, the third and fourth terms on the right-hand side of equation (11) is to compute the energy for identifying X error locations. That is, equation (11) has an energy computation part for identifying Z error locations and an energy computation part for identifying X error locations separately. That is, equation (11) does not involve correlation between Z error location and X error location. The separate identification of X errors and Z errors as in equation (11) may lead to failing to detect original Y errors.

Figure 19:
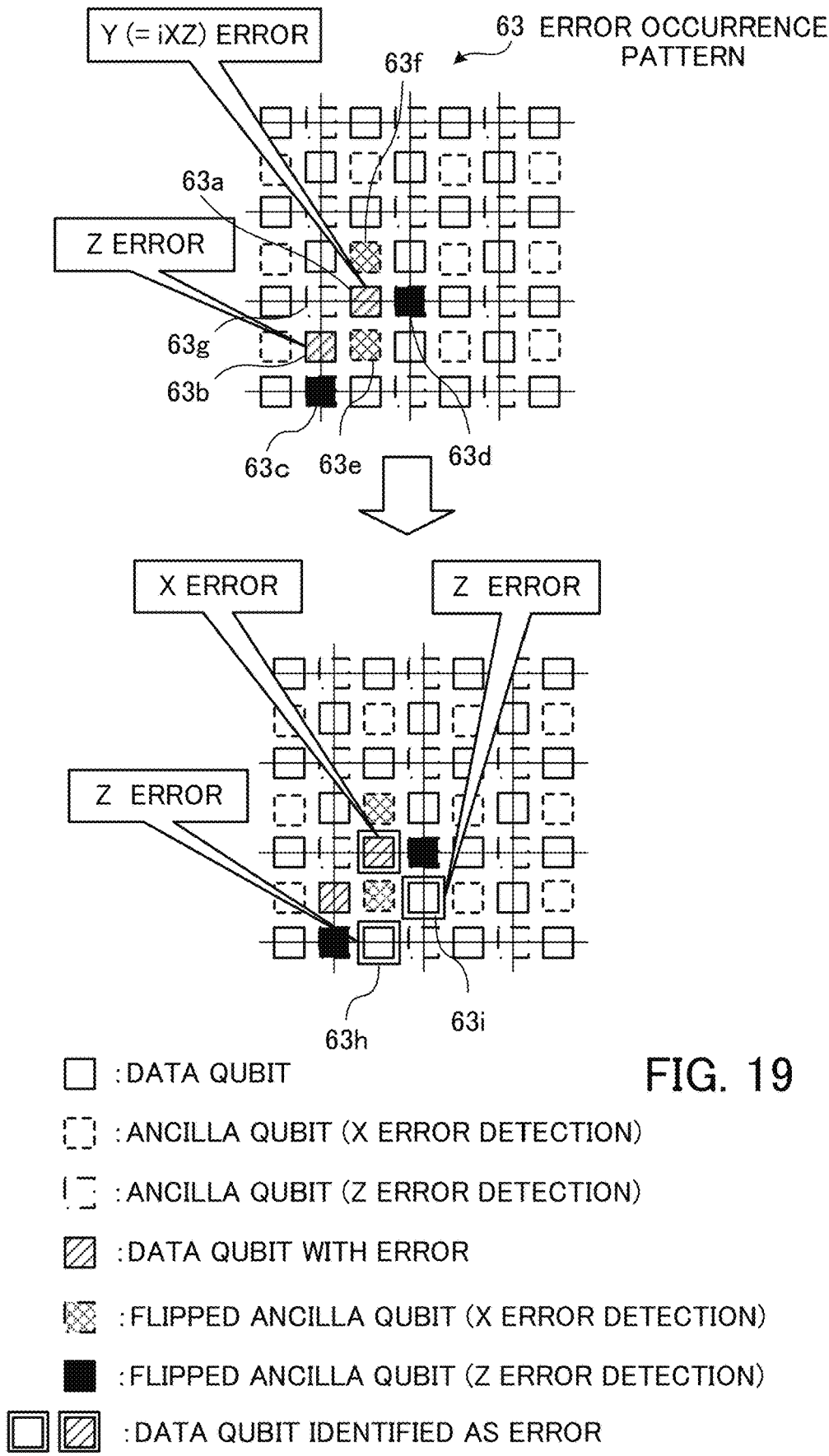
FIG. 19 illustrates an example of a failure in Y error detection.

FIG. 19 illustrates an example of a failure in Y error detection. For example, consider the same error occurrence pattern 63 as illustrated in FIG. 17. In this case, there is a possibility that an X error is detected on the data qubit 63a and Z errors are detected on two data qubits 63h and 63i. In this example, although errors have actually occurred at two locations, the three data qubits are identified as error locations.

The incorrect error detection case as illustrated in FIG. 19 and the correct error detection case as illustrated in FIG. 17 have the same energy value in equation (11). Therefore, if the energy computation is performed using equation (11), the correct error detection and the incorrect error detection may occur with the same probability.

A failure in correct identification of a Y error causes a logical error.

Figure 20:
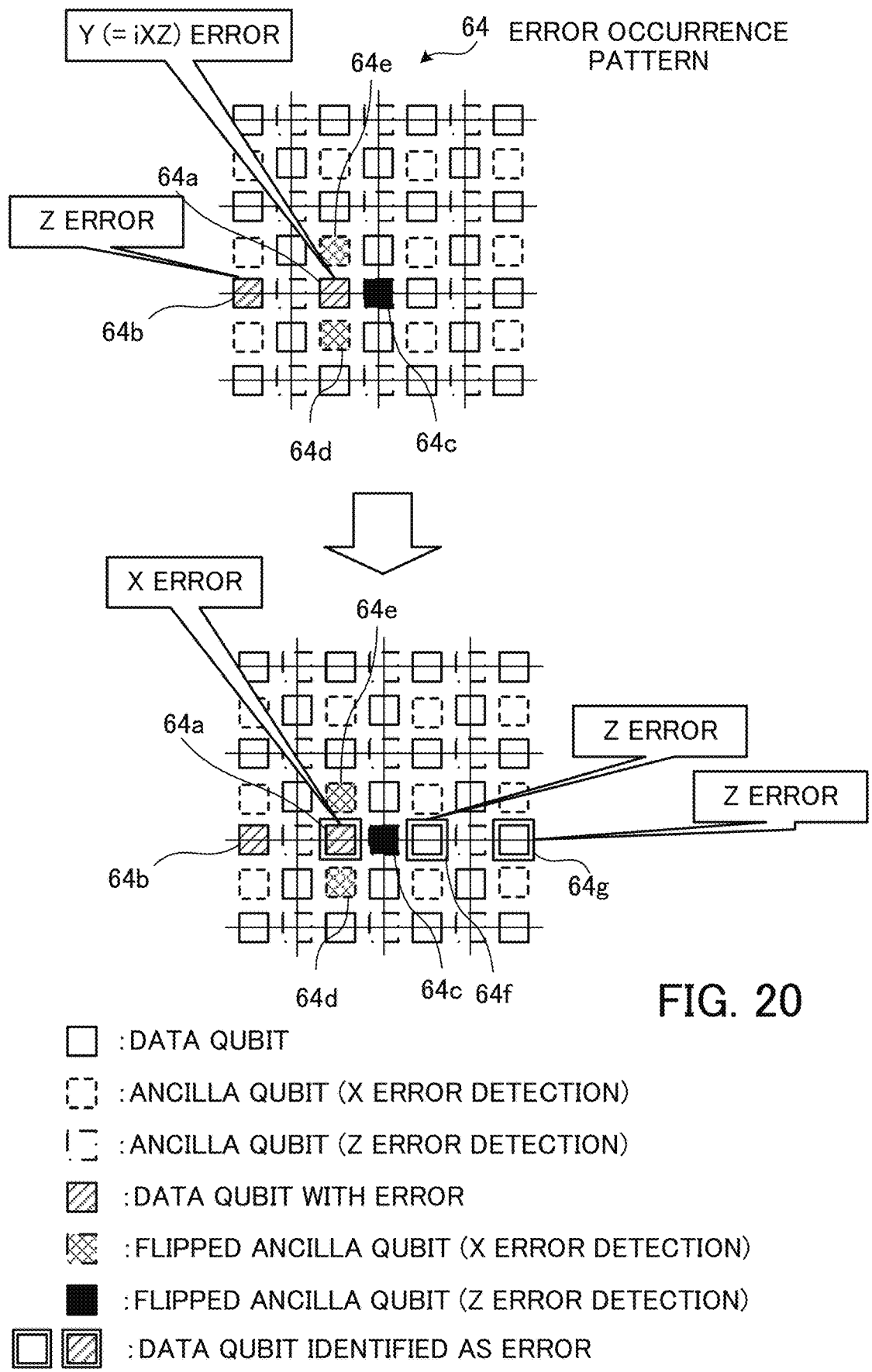
FIG. 20 illustrates an example of a logical error that occurs due to a failure in Y error detection.

FIG. 20 illustrates an example of a logical error that occurs due to a failure in Y error detection. An error occurrence pattern 64 illustrated in FIG. 20 indicates that a data qubit 64a with a Y error and a data qubit 64b with a Z error are located on the same row. The data qubits 64a and 64b with the errors are located two columns away from each other. In this case, the state of an ancilla qubit 64c for Z error detection and the states of ancilla qubits 64d and 64e for X error detection are flipped.

If error locations are identified using equation (11) in this case, there is a possibility that an X error is detected on the data qubit 64a and Z errors are detected on data qubits 64f and 64g. If error correction is performed on the basis of this detection result, a logical error occurs as to the Z errors. That is, since the Y error is not identified correctly, the logical error rate is increased.

To avoid this, the classical computer 100 identifies error locations using equation (12) that includes equation (11) and an additional term that tends to align the spin variables $\sigma_i$ and $\sigma'_i$ corresponding to the same data qubit in the same direction.

$$H = -J\sum_v^{N_v} b_v \prod_{i \in E_v}^{4} \sigma_i - h\sum_i^{N_d} \sigma_i - J\sum_f^{N_f} b_f \prod_{i \in E_f}^{4} \sigma'_i - h\sum_i^{N_d} \sigma'_i - \sum_i^{N_d} J'_i \sigma_i \sigma'_i \quad (12)$$

Here, $J'_i$ is a coefficient (positive real number) indicating a weight for each data qubit in the fifth term. The first to fourth terms on the right-hand side of equation (12) is the same as those of equation (11). The fifth term is for aligning the spin variables $\sigma_i$ and $\sigma'_i$ corresponding to the same data qubit in the same direction. The fifth term acts to reduce the energy as the values of the spin variables $\sigma_i$ and $\sigma'_i$ corresponding to the same data qubit become more equal to each other.

Figure 21:
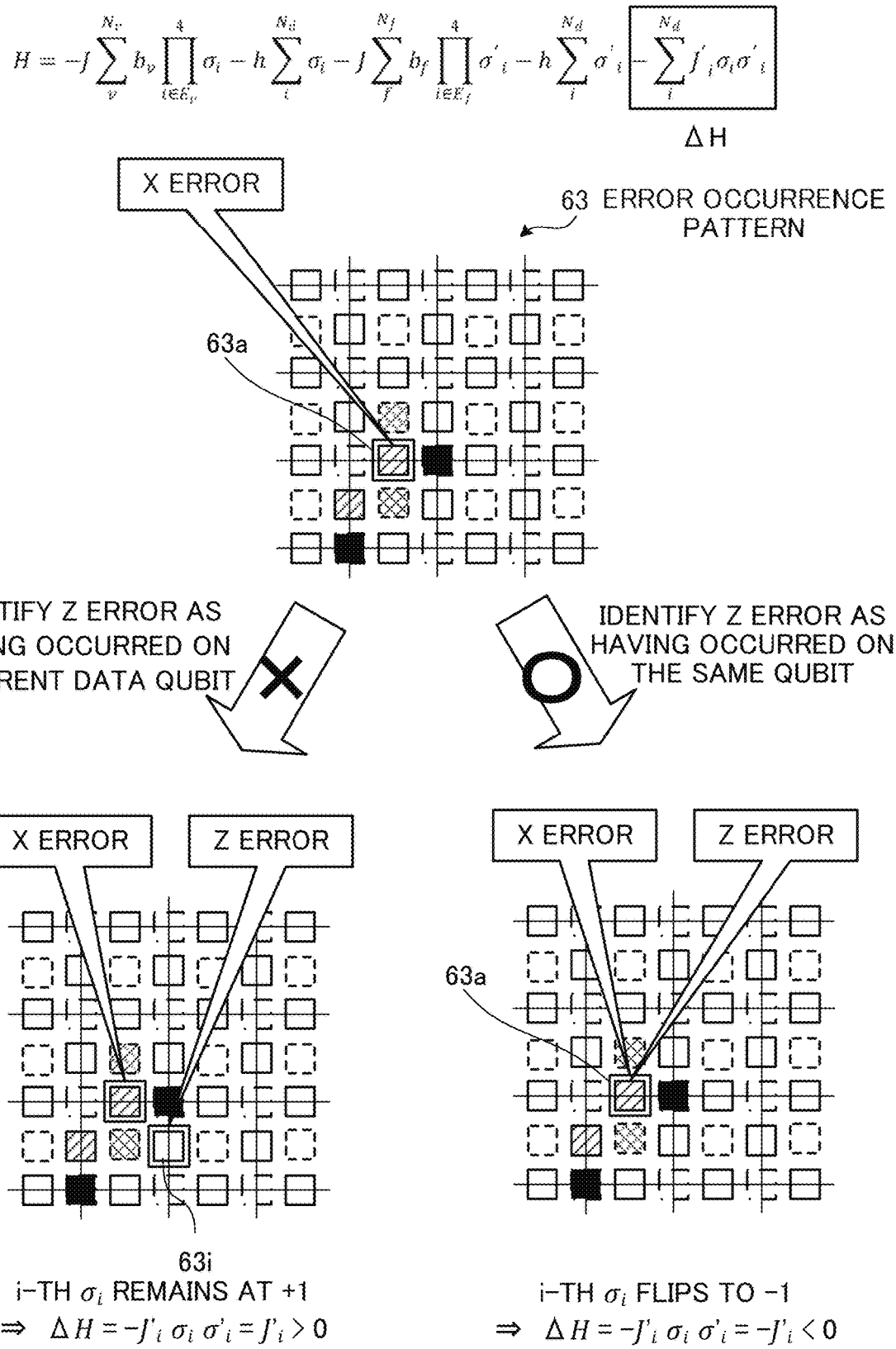
FIG. 21 illustrates an example of error location identification that correctly identifies a Y error.

FIG. 21 illustrates an example of error location identification that correctly identifies a Y error. For example, assume that errors have occurred as indicated in the error occurrence pattern 63 illustrated in FIGS. 17 and 19. In addition, assume that the data qubit 63a has been identified as an X error location. In this case, the value of the spin variable $\sigma'_i$ for X error detection corresponding to the data qubit 63a becomes "−1."

The case where a different data qubit 63i is identified as a Z error location and the case where the same data qubit 63a is identified as a Z error location are compared with each other in terms of the energy of equation (12).

Irrespective of whether the data qubit 63a or the data qubit 63i is identified as a Z error location, both the cases have the same value in each of the first to fourth terms on the right-hand side of equation (12). Here, a change in the value of the fifth term that makes a difference is taken as ΔH.

In the case where the data qubit 63i is identified as a Z error location, the value of the spin variable $\sigma_i$ for Z error detection corresponding to the data qubit 63a remains at "+1." That is, the two spin variables $\sigma_i$ and $\sigma'_i$ corresponding to the data qubit 63a have different values. Therefore, the change in the value of the fifth term on the right-hand side is obtained as "$\Delta H = -J'_i \sigma_i \sigma'_i = J'_i > 0$."

On the other hand, in the case where the data qubit 63a is identified as a Z error location, the value of the spin variable $\sigma_i$ for Z error detection corresponding to the data qubit 63a becomes "−1." That is, the two spin variables $\sigma_i$ and $\sigma'_i$ corresponding to the data qubit 63a have the same value. Therefore, the change in the value of the fifth term on the right-hand side is obtained as "$\Delta H = -J'_i \sigma_i \sigma'_i = -J'_i < 0$."

As described above, with equation (12), the case of identifying the same data qubit as a location of both a Z error and an X error results in a lower energy than the case of identifying different data qubits. Thus, the probability of identifying Y errors is increased.

The following describes how to determine the value of the coefficient $J'_i$. For example, the classical computer 100 sets the coefficient $J'_i$ to a higher value if a Y error occurs independently.

Figure 22:
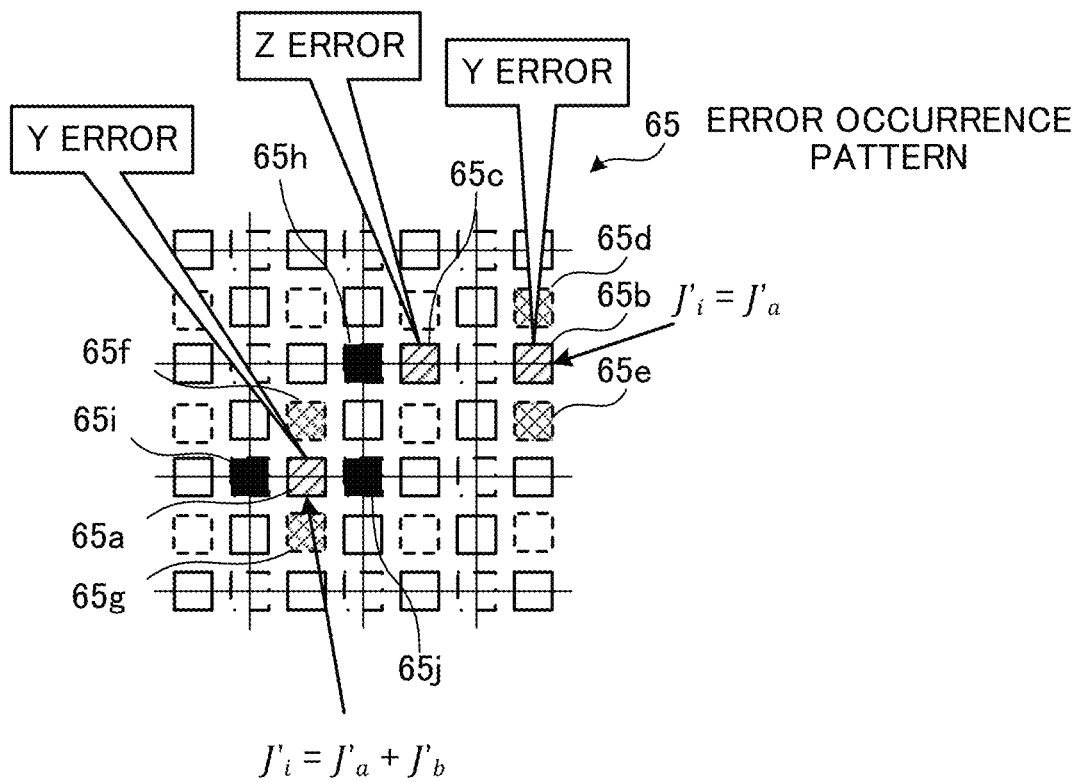
FIG. 22 illustrates an example of how to determine the value of a coefficient $J'_i$.

FIG. 22 illustrates an example of how to determine the value of the coefficient $J'_i$. For example, if it is determined as a result of measuring the ancilla qubits adjacent to the i-th data qubit that both the ancilla qubits for Z error detection and the ancilla qubits for X error detection have been flipped, the classical computer 100 sets "$J'_i = J'_a + J'_b$." If it is determined as the result of measuring the ancilla qubits adjacent to the i-th data qubit that only either the ancilla qubits for Z error detection or the ancilla qubits for X error detection have been flipped, on the other hand, the classical computer 100 sets "$J'_i = J'_a$." In this connection, $J'_a$ and $J'_b$ are constant parameters (positive real numbers).

An error occurrence pattern 65 illustrated in FIG. 22 indicates that Y errors have occurred on two data qubits 65a and 65b and a Z error has occurred on one data qubit 65c. In this error occurrence pattern 65, the states of ancilla qubits 65d to 65g for X error detection and the states of ancilla qubits 65h to 65j for Z error detection have been flipped.

As to the ancilla qubits adjacent to the data qubit 65a with the Y error, both the ancilla qubits for X error detection and the ancilla qubits for Z error detection have been flipped. Therefore, the coefficient for the data qubit 65a, when taken as the i-th data qubit, is set to "$J'_i = J'_a + J'_b$."

As to the ancilla qubits adjacent to the data qubit 65b with the Y error, the ancilla qubits for X error detection have been flipped, but the ancilla qubits for Z error detection have not been flipped. Therefore, the coefficient for the data qubit 65b, when taken as the i-th data qubit, is set to "$J'_i = J'_a$."

In the manner described above, the coefficient $J'_i$ is set to a higher value for a data qubit that is more likely to have had a Y error. This makes it possible to detect Y errors correctly.

Figure 23:
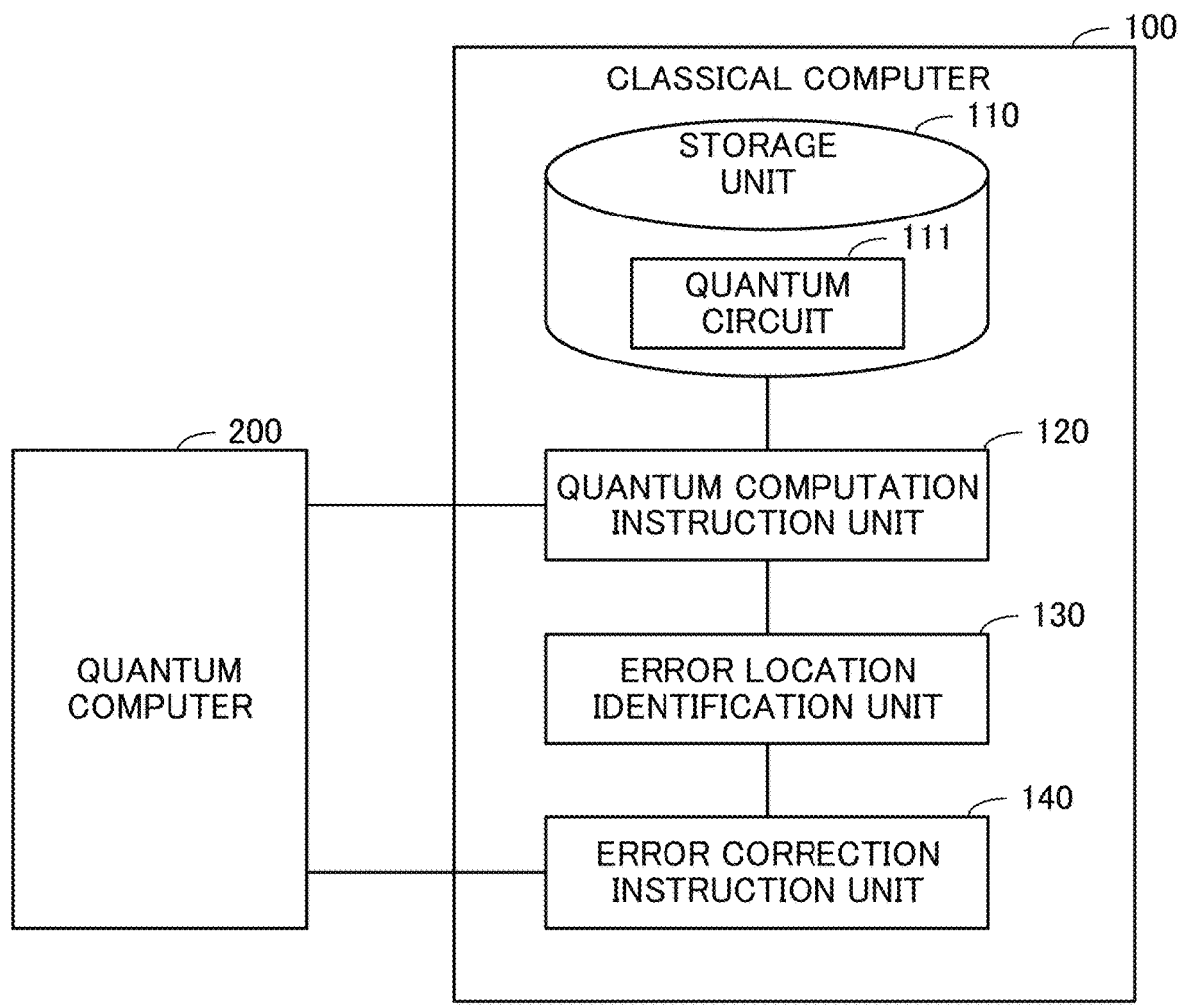
FIG. 23 illustrates an example of functions of the classical computer to make an instruction for quantum computation involving error detection.

FIG. 23 illustrates an example of functions of the classical computer to make an instruction for quantum computation involving error detection. The classical computer 100 includes a storage unit 110, a quantum computation instruction unit 120, an error location identification unit 130, and an error correction instruction unit 140.

The storage unit 110 stores therein a quantum circuit 111 that is executed on the quantum computer 200.

The quantum computation instruction unit 120 sends a request for executing the quantum circuit 111 to the quantum computer 200. Then, the quantum computation instruction unit 120 obtains the result of executing the quantum circuit from the quantum computer 200. In addition, when receiving a result of measuring the states of ancilla qubits from the quantum computer 200, the quantum computation instruction unit 120 transfers the received measurement result to the error location identification unit 130.

The error location identification unit 130 identifies data qubits each with an X error, Z error or Y error on the basis of the measurement result of the states of the ancilla qubits. For example, the error location identification unit 130 obtains the spin states of spins that minimize the energy equation of the Ising model represented by equation (12), and identifies error locations on the basis of the data qubits corresponding to spins in flipped states. The error location identification unit 130 sends the result of identifying the error locations to the error correction instruction unit 140.

The error correction instruction unit 140 instructs the quantum computer 200 to perform gate operations to correct the occurring errors. For example, the error correction instruction unit 140 makes an instruction to perform an X gate operation on a data qubit with an X error. In addition, the error correction instruction unit 140 makes an instruction to perform a Z gate operation on a data qubit with a Z error. Furthermore, the error correction instruction unit 140 makes an instruction to perform a Y gate operation on a data qubit with a Y error.

In this connection, the functions of each element illustrated in FIG. 23 may be implemented by a computer executing a program module corresponding to the element, for example.

The quantum computer 200 performs quantum computation according to the quantum circuit 111. In the course of the quantum computation, the quantum computer 200 periodically performs gate operations for Z error detection and X error detection and measures the states of ancilla qubits. The quantum computer 200 sends the result of measuring the ancilla qubits to the classical computer 100.

Figure 24:
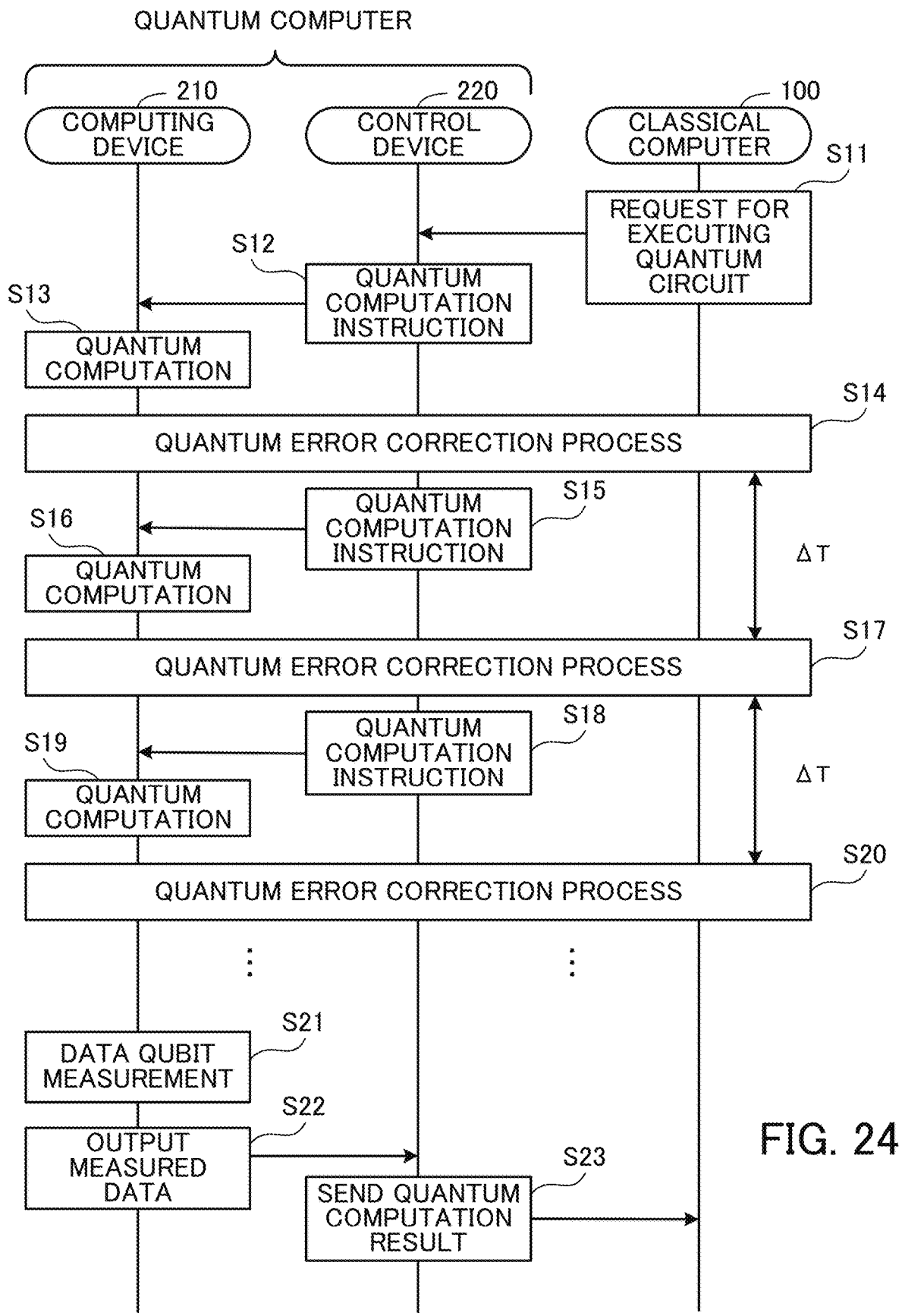
FIG. 24 is a sequence diagram illustrating a procedure for quantum computation.

FIG. 24 is a sequence diagram illustrating a procedure for quantum computation. The classical computer 100 sends a request for executing the quantum circuit 111 to the control device 220 of the quantum computer 200 (step S11). The control device 220 sends to the computing device 210 a quantum computation instruction to perform quantum computation according to the quantum circuit 111 (step S12). The computing device 210 performs the quantum computation by performing gate operations on qubits in accordance with the quantum computation instruction (step S13). After that, the classical computer 100 and the quantum computer 200 perform a quantum error correction process in collaboration with each other at predetermined timing (step S14).

Thereafter, the quantum computation instruction is made by the control device 220 (step S15), and the quantum computation is performed by the computing device 210 (step S16). After a predetermined period of time ΔT has passed since the last error correction process, the quantum error correction process is performed (step S17). Then, in the same manner as above, the quantum computation instruction is made by the control device 220 (step S18), the quantum computation is performed by the computing device 210 (step S19), and after the predetermined period of time ΔT has passed since the last error correction process, the quantum error correction process is performed (step S20).

The above quantum computation and quantum error correction process are repeated, and at the end of the quantum circuit 111, the computing device 210 measures the states of the data qubits (step S21). Then, the computing device 210 sends the result of measuring the data qubits to the control device 220 (step S22). The control device 220 sends information indicating the measurement result as a quantum computation result to the classical computer 100 (step S23).

As described above, the quantum error correction process is performed periodically in the course of the quantum computation. The quantum error correction process identifies the locations of X errors, Z errors, and Y errors using the Ising model and corrects the occurring errors.

Figure 25:
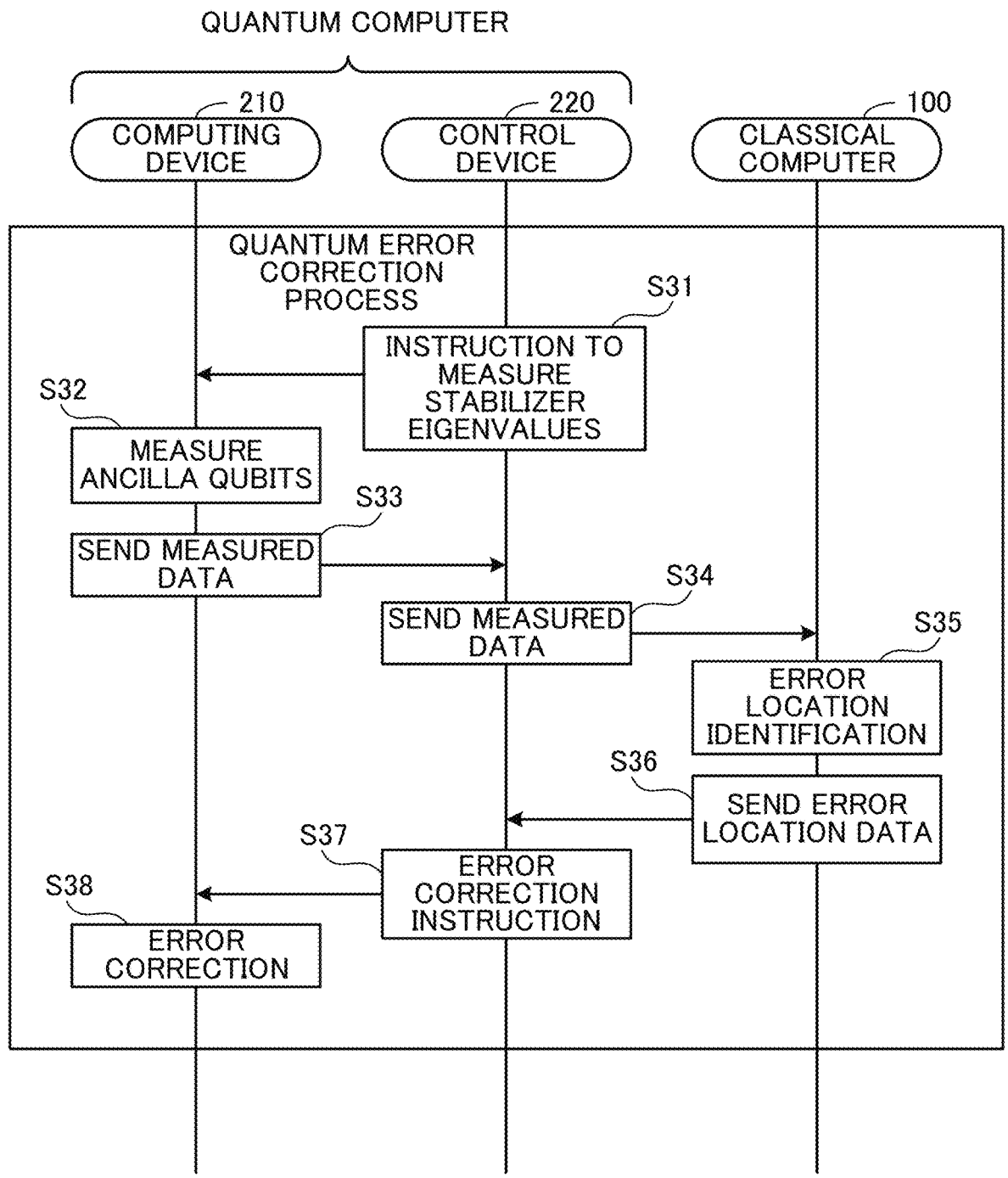
FIG. 25 is a sequence diagram illustrating an example procedure for a quantum error correction process.

FIG. 25 is a sequence diagram illustrating an example procedure for a quantum error correction process. The control device 220 of the quantum computer 200 sends an instruction to measure stabilizer eigenvalues to the computing device 210 (step S31). The computing device 210 performs two-qubit gate operations for X error detection and Z error detection, and then measures the states of the ancilla qubits (step S32). The computing device 210 sends the measured data indicating the measured states of the ancilla qubits to the control device 220 (step S33). The control device 220 sends the measured data received from the computing device 210 to the classical computer 100 (step S34).

The classical computer 100 identifies error locations on the basis of the measured data (step S35). The classical computer 100 sends error location data indicating the identified error locations to the control device 220 (step S36).

The control device 220 sends, to the computing device 210, an error correction instruction for the data qubits with errors that are indicated in the error location data (step S37). The computing device 210 performs error correction in accordance with the error correction instruction (step S38).

The following describes in detail a surface-code-based error location identification process.

Figure 26:
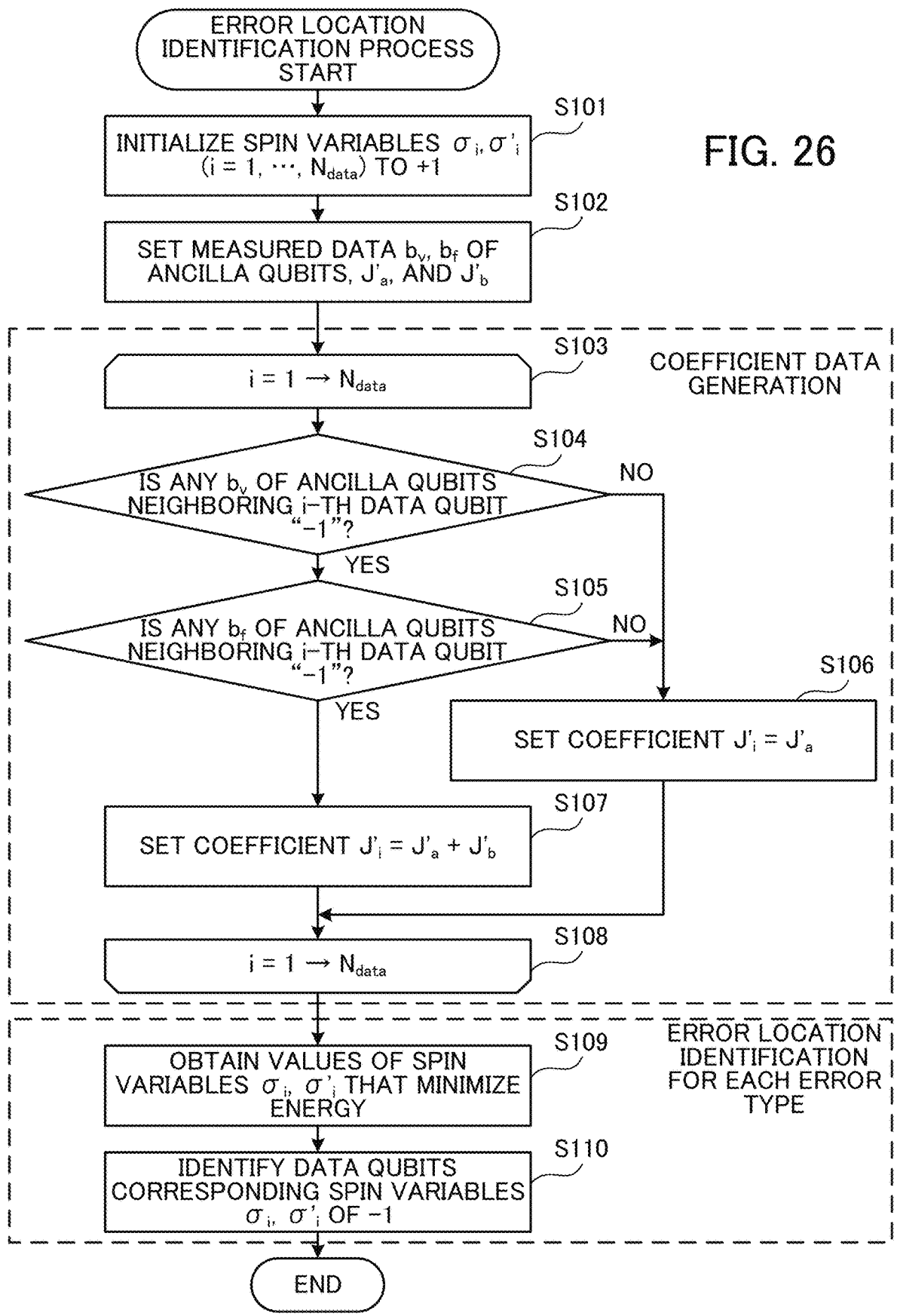
FIG. 26 is a flowchart illustrating an example procedure for an error location identification process.

FIG. 26 is a flowchart illustrating an example procedure for an error location identification process. In the following, the process of FIG. 26 will be described step by step.

(Step S101) The error location identification unit 130 initializes the values of spin variables $\sigma_i$ and $\sigma'_i$ (i=1, . . . , $N_{data}$) to "+1," where $N_{data}$ denotes the number of data qubits.

(Step S102) The error location identification unit 130 sets the values of the measured data $b_v$ and $b_f$ (v=1, . . . , $N_z$, f=1, . . . , $N_x$) of the ancilla qubits and the values of $J'_a$ and $J'_b$. $N_x$ denotes the number of ancilla qubits for X error detection, and $N_z$ denotes the number of ancilla qubits for Z error detection.

(Step S103) The error location identification unit 130 counts up i from 1, and repeats the process of steps S104 to S107 until i reaches $N_{data}$. The process of steps S104 to S107 is a process of determining the coefficient $J'_i$ for each data qubit. The coefficient $J'_i$ for the i-th data qubit is determined based on the measured data of the ancilla qubits neighboring the i-th data qubit.

Figure 27:
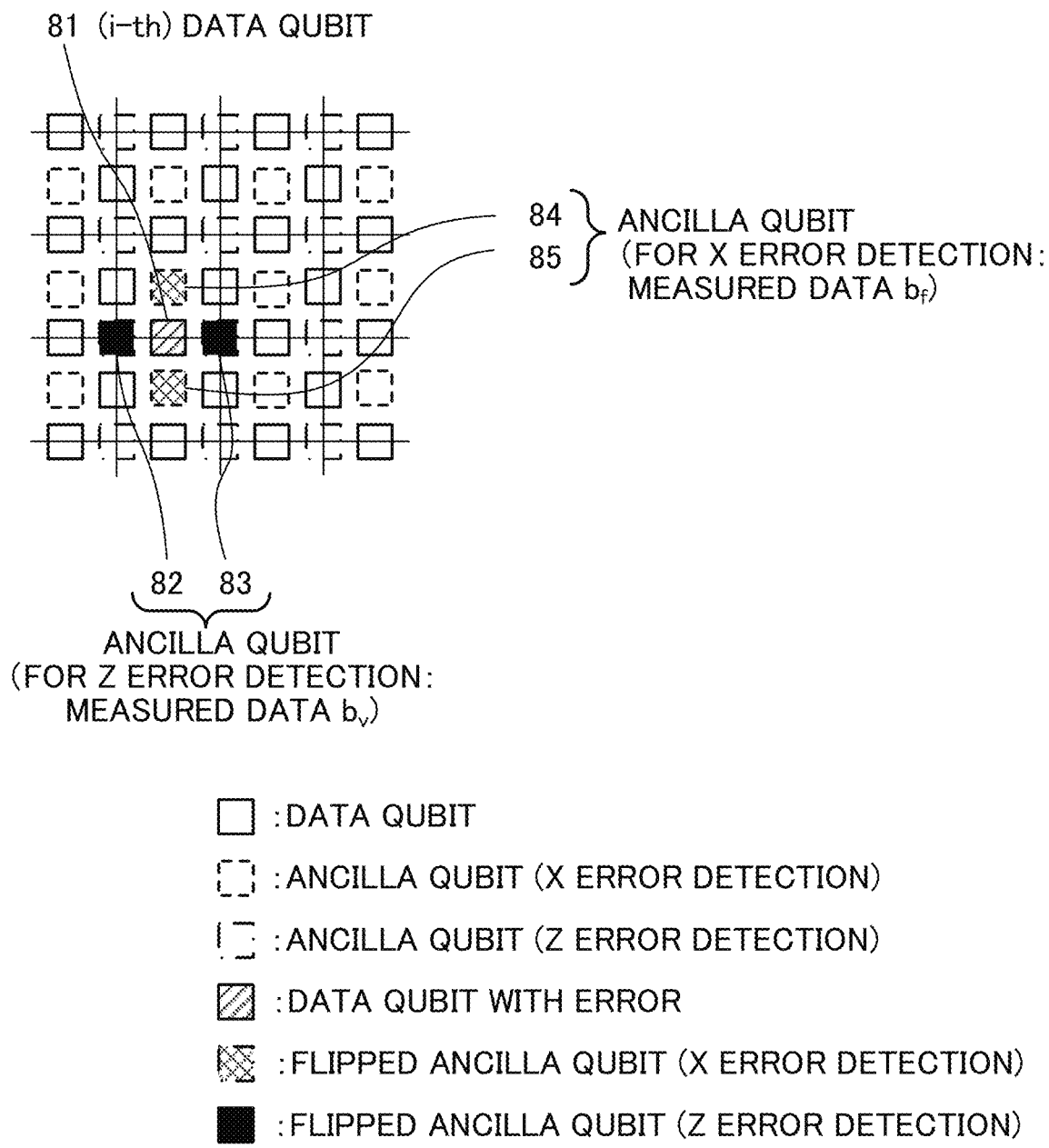
FIG. 27 illustrates an example of the arrangement of ancilla qubits neighboring a data qubit.

FIG. 27 illustrates an example of the arrangement of ancilla qubits neighboring a data qubit. For example, a data qubit 81 illustrated in FIG. 27 is taken as the i-th data qubit. In this case, ancilla qubits 82 and 83 directly on the right and left sides of the data qubit 81 are neighboring ancilla qubits for Z error detection. In addition, ancilla qubits 84 and 85 directly above and under the data qubit 81 are neighboring ancilla qubits for X error detection.

Refer now back to FIG. 26.

(Step S104) The error location identification unit 130 determines whether any value of the measured data $b_v$ of the ancilla qubits for Z error detection neighboring the i-th data qubit is "−1." If the error location identification unit 130 determines that the measured data $b_v$ of at least one of the neighboring ancilla qubits has a value of "−1," the process proceeds to step S105. If the error location identification unit 130 determines that the measured data $b_v$ of all of the neighboring ancilla qubits has a value of "1," the process proceeds to step S106.

(Step S105) The error location identification unit 130 determines whether any value of the measured data $b_f$ of the ancilla qubits for X error detection neighboring the i-th data qubit has a value of "−1." If the error location identification unit 130 determines that the measured data $b_f$ of at least one of the neighboring ancilla qubits has a value of "−1," the process proceeds to step S107. If the error location identification unit 130 determines that the measured data $b_f$ of all of the neighboring ancilla qubits has a value of "1," the process proceeds to step S106.

(Step S106) The error location identification unit 130 sets the coefficient $J'_i$ to "$J'_i=J'_a$." Then, the process of the error location identification unit 130 proceeds to step S108.

(Step S107) The error location identification unit 130 sets the coefficient $J'_i$ to "$J'_i=J'_a+J'_b$."

(Step S108) When i has reached $N_{data}$ while the process of steps S104 to S107 is repeated, the process of the error location identification unit 130 proceeds to step S109.

Through the process of steps S103 to S108, the coefficient data indicating the value of the coefficient $J'_i$ for each data qubit is generated.

(Step S109) The error location identification unit 130 obtains the values of the spin variables $\sigma_i$ and $\sigma'_i$ that minimize the energy of the Ising model represented by equation (12). For example, the error location identification unit 130 is able to obtain the values of the spin variables $\sigma_i$ and $\sigma'_i$ that minimize the energy, with a search method for solving combinatorial optimization problems.

(Step S110) The error location identification unit 130 identifies, as error locations, data qubits corresponding to the spin variables $\sigma_i$ and $\sigma'_i$ with a value of "−1." In addition, the error location identification unit 130 also identifies the type (X error, Z error, or Y error) of each error occurring on the data qubits identified as the error locations. That is, the process of steps S109 to S110 is an error location identification process for each error type.

For example, in the case where the spin variable $\sigma_i$ of the i-th data qubit has a value of "−1" and the spin variable $\sigma'_i$ thereof has a value of "+1," the error location identification unit 130 identifies the data qubit as a Z error location. Further, in the case where the spin variable $\sigma_i$ of the i-th data qubit has a value of "+1" and the spin variable $\sigma'_i$ thereof has a value of "−1," the error location identification unit 130 identifies the data qubit as an X error location. Still further, in the case where the spin variable $\sigma_i$ of the i-th data qubit has a value of "−1" and the spin variable $\sigma'_i$ thereof also has a value of "−1," the error location identification unit 130 identifies the data qubit as a Y error location.

In the manner described above, the locations of Z errors, X errors, and Y errors are identified. The error locations are identified by solving the energy minimization problem of the Ising model represented by equation (12). This energy equation includes a term (the fifth term on the right-hand side) that reduces the energy as the values of the spin variables $\sigma_i$ and $\sigma'_i$ of the i-th data qubit become more equal to each other. This results in increasing the Y error identification rate. In addition, since it is possible to correct occurring errors correctly, the logical error rate is reduced.

Figure 29:
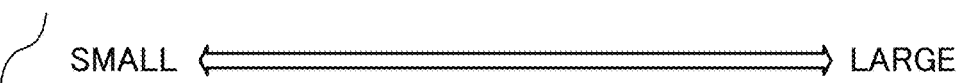
FIG. 29 illustrates a result of calculating a logical error rate.

The following describes in detail the effect of increasing the Y error identification rate and the effect of reducing the logical error rate. FIGS. 28 and 29 respectively illustrate results of calculating the Y error identification rate and the logical error rate, in the cases where error correction is performed with taking into account the positional relationship between Z and X errors (using equation (12)) and without taking into account the positional relationship between Z and X errors (using equation (11)).

In this connection, the Y error identification rate is calculated as "the number of identified Y errors divided by the number of actual Y errors." To obtain the number of actual Y errors, simulations were carried out using the classical computer 100, in which the error location identification process was performed using a result of generating errors and generating data indicating the states of ancilla qubits. The logical error rate is calculated as "the number of occurrences of a logical error divided by the number of trials."

The following example relates to calculating the above evaluation values (Y error identification rate and logical error rate) by simulating error correction in a surface code in which six data qubits "d=6" are arranged in one dimension of a two-dimensional qubit array for one logical qubit. For the energy minimization, simulated annealing (SA) was used. In addition, the evaluation values for the values of $J'_a$ and $J'_b$ were calculated while changing the values of $J'_a$ and $J'_b$. For each combination of $J'_a$ and $J'_b$, physical errors were generated in 1000 patterns and the evaluation values were calculated. The physical error rate p was "p=10%."

FIG. 28 illustrates a result of calculating a Y error identification rate. In a Y-error identification rate table 91, the values of $J'_a$ are set as row labels, and the values of $J'_b$ are set as column labels. The $J'_a$ value on a certain row is smaller than that on its lower row, and is larger than that on its upper row. The $J'_b$ value on a certain column is smaller than that on its right column, and is larger than that on its left column. At the intersection of a certain row and column in the Y-error identification rate table 91, a Y error identification rate obtained by performing error correction with the $J'_a$ value on the row and the $J'_b$ value on the column is set. In this connection, the Y error identification rate in the Y-error identification rate table 91 is expressed in percentage.

In the Y-error identification rate table 91, the $J'_a$ value on the first row is "0.0," and the $J'_b$ value on the first column is also "0.0." In the case where both the $J'_a$ value and the $J'_b$ value are "0," the fifth term of the energy equation (12) always yields a value of "0." Therefore, the value set at the intersection of the first row and first column in the Y-error identification rate table 91 corresponds to a Y error identification rate obtained without taking into account the positional relationship between Z and X errors (using equation (11)). Referring to the example of FIG. 28, the Y error identification rate without taking into account the positional relationship between Z and X errors is "19.4%."

The Y error identification rate increases with an increase in each of the $J'_a$ and $J'_b$ values. For example, the Y error identification rate obtained with "$J'_a=4.0$" and "$J'_b=2.0$" is "49.4%." That is, setting "$J'_a=4.0$" and "$J'_b=2.0$," the Y error identification rate is approximately 2.5 times as high as that obtained without taking into account the positional relationship between Z and X errors.

FIG. 29 illustrates a result of calculating a logical error rate. In a logical error rate table 92, the values of $J'_a$ are set as row labels, and the values of $J'_b$ are set as column labels. The $J'_a$ value on a certain row is smaller than that on its lower row, and is larger than that on its upper row. The $J'_b$ value on a certain column is smaller than that on its right column, and is larger than that on its left column. At the intersection of a certain row and column in the logical error rate table 92, the logical error rate obtained by performing error correction with the $J'_a$ value on the row and the $J'_b$ value on the column is set. In this connection, the logical error rate in the logical error rate table 92 is expressed in percentage.

In the logical error rate table 92, the $J'_a$ value on the first row is "0.0," and the $J'_b$ value on the first column is also "0.0." In the example of FIG. 29, the logical error rate obtained without taking into account the positional relationship between Z and X errors (on the first row and first column in the logical error rate table 92) is "65.0%."

The logical error rate decreases with an increase in each of the $J'_a$ and $J'_b$ values. For example, the logical error rate obtained with "$J'_a$=4.0" and "$J'_b$=2.0" is "32.9%." That is, setting "$J'_a$=4.0" and "$J'_b$=2.0," the logical error rate is approximately halved compared to that obtained without taking into account the positional relationship between Z and X errors.

In this connection, if the $J'_b$ value is set too large, the logical error rate increases. In the example of FIG. 29, in situations of "$J'_a$=4.0" and "$J'_b \geq 4.0$," the logical error rate increases with an increase in the $J'_b$ value.

Third Embodiment

A third embodiment relates to computing the minimum value of the energy of an Ising model using dedicated hardware.

Figure 30:
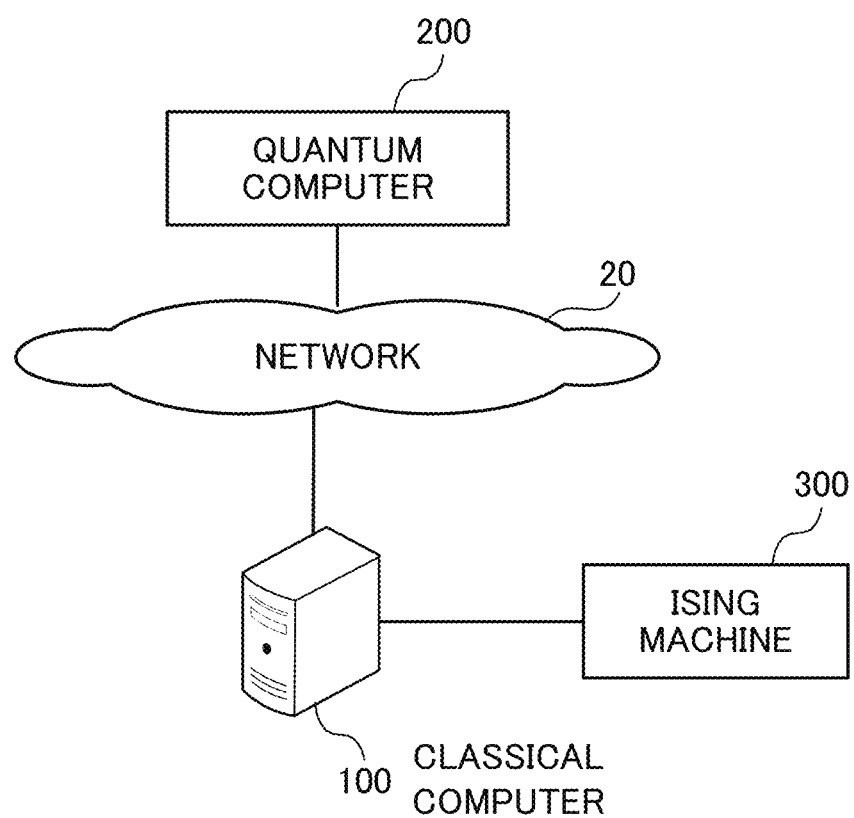
FIG. 30 illustrates an example of a system configuration according to a third embodiment.

FIG. 30 illustrates an example of a system configuration according to the third embodiment. In the third embodiment, an Ising machine 300 is connected to the classical computer 100. The Ising machine 300 is a computer specialized for solving an optimization problem using an Ising model. The Ising machine 300 is able to find the minimum value of the energy of the Ising model using an ASIC, PLD, GPU, and other dedicated processors, for example.

A quantum computation process of the third embodiment differs from that of the second embodiment only in the error location identification process. Therefore, the following describes in detail the error location identification process of the third embodiment.

Figure 31:
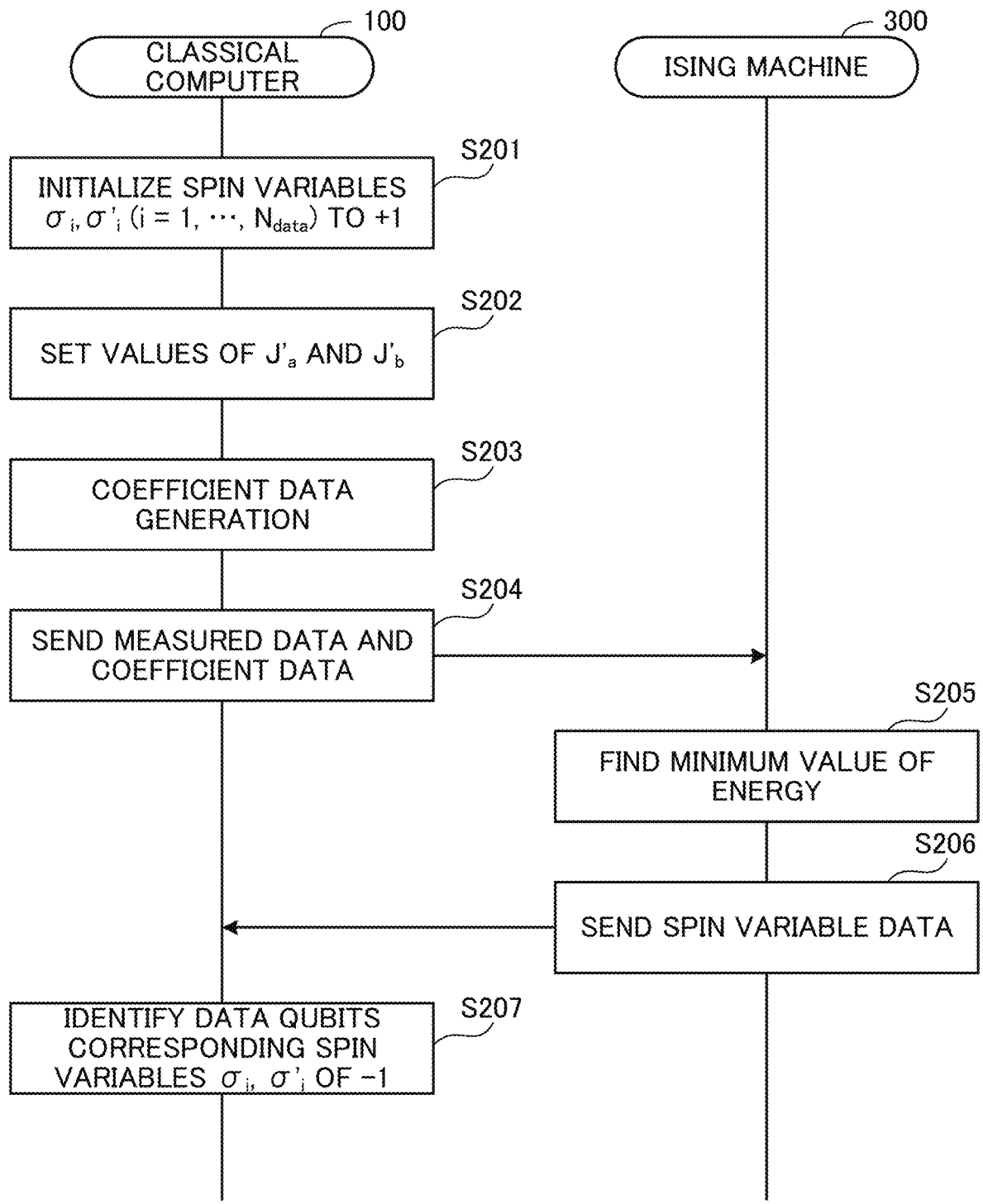
FIG. 31 is a sequence diagram illustrating a procedure for an error location identification process according to the third embodiment.

FIG. 31 is a sequence diagram illustrating a procedure for an error location identification process according to the third embodiment. The process of initializing spin variables at step S201 is the same as the process of step S101 of FIG. 26. After initializing the spin variables, the error location identification unit 130 of the classical computer 100 sets the values of $J'_a$ and $J'_b$ (step S202). The next step S203 is the coefficient data generation process of steps S103 to S108 of FIG. 26.

When the coefficient data generation process is completed, the classical computer 100 sends measured data indicating the states of ancilla qubits and coefficient data indicating the value of the coefficient $J'_i$ for each data qubit to the Ising machine 300 (step S204). Then, the Ising machine 300 searches for the minimum value of the energy of the Ising model on the basis of the measured data and coefficient data, and generates spin variable data indicating the values of spin variables $\sigma_i$ and $\sigma'_i$ that give the minimum value (step S205). The Ising machine 300 sends the generated spin variable data to the classical computer 100 (step S206).

The classical computer 100 identifies, as error locations, data qubits corresponding to the spin variables $\sigma_i$ and $\sigma'_i$ with a value of "−1" on the basis of the obtained spin variable data (step S207). This process is the same as that of step S110 of FIG. 26.

As described above, by causing the Ising machine 300 to compute the values of the spin variables $\sigma_i$ and $\sigma'_i$, it is possible to reduce the time needed to perform the error location identification process. This results in a reduction in the processing time of the entire quantum computation.

Other Embodiments

The above-described embodiments use the surface code as an example, but are applicable not only to the surface code but also to general CSS codes formed of X and Z stabilizers as they are.

Although the embodiments have been described as examples, the components of each unit in the embodiments may be replaced with other components having equivalent functions. In addition, other desired configurations and steps may be added. Furthermore, two or more desired configurations (features) in the above-described embodiments may be combined.

According to one aspect, it is possible to increase the success probability of identifying the locations of Y errors.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
    obtaining first state data and second state data, the first state data indicating states of a plurality of first ancilla qubits used for Z error detection on a plurality of data qubits included in a logical qubit in quantum computation, the second state data indicating states of a plurality of second ancilla qubits used for X error detection on the plurality of data qubits;
    determining, based on an energy equation, a combination of a first data qubit with a Z error and a second data qubit with an X error that further reduces an energy represented by the energy equation, the energy equation including a first energy term, a second energy term, and a third energy term, the first energy term being used to identify the first data qubit among the plurality of data qubits, based on the first state data, the second energy term being used to identify the second data qubit among the plurality of data qubits, based on the second state data, the third energy term being to reduce the energy as a number of data qubits each being a third data qubit increases, the third data qubit being identified both as the first data qubit and as the second data qubit; and
    determining that a Y error has occurred on the third data qubit, the Z error has occurred on the first data qubit that is not identified as the third data qubit, and the X error has occurred on the second data qubit that is not identified as the third data qubit.

2. The non-transitory computer-readable storage medium according to claim 1, wherein
    the third energy term includes a coefficient of controlling a reduction amount of the energy, for each of the plurality of data qubits, and the determining of the combination of the first data qubit and the second data qubit includes computing a value of the coefficient for each of the plurality of data qubits, based on the states of first ancilla qubits and second ancilla qubits adjacent to said each of the plurality of data qubits.

3. The non-transitory computer-readable storage medium according to claim 1, wherein
the first state data indicates whether the state of each of the plurality of first ancilla qubits has flipped from a first initial state,
the second state data indicates whether the state of each of the plurality of second ancilla qubits has flipped from a second initial state, and
the determining of the combination of the first data qubit and the second data qubit includes setting, upon detecting a case where at least one state of first ancilla qubits adjacent to one data qubit has flipped from the first initial state and at least one state of second ancilla qubits adjacent to the one data qubit has flipped from the second initial state, the coefficient for the one data qubit to a higher value than another case other than the case.

4. The non-transitory computer-readable storage medium according to claim 2, wherein the determining of the combination of the first data qubit and the second data qubit includes sending coefficient data indicating the value of the coefficient for each of the plurality of data qubits, the first state data, and the second state data to an Ising machine, and causing the Ising machine to find the combination of the first data qubit and the second data qubit that further reduces the energy represented by the energy equation.

5. The non-transitory computer-readable storage medium according to claim 1, wherein
the obtaining of the first state data and the second state data includes obtaining the first state data and the second state data from a quantum computer performing the quantum computation, and
the process further includes instructing the quantum computer to perform error correction, based on a result of determining data qubits each with the Y error, Z error, or X error.

6. An error detection method comprising:
obtaining first state data and second state data, the first state data indicating states of a plurality of first ancilla qubits used for Z error detection on a plurality of data qubits included in a logical qubit in quantum computation, the second state data indicating states of a plurality of second ancilla qubits used for X error detection on the plurality of data qubits;
determining, by a processor, based on an energy equation, a combination of a first data qubit with a Z error and a second data qubit with an X error that further reduces an energy represented by the energy equation, the energy equation including a first energy term, a second energy term, and a third energy term, the first energy term being used to identify the first data qubit among the plurality of data qubits, based on the first state data, the second energy term being used to identify the second data qubit among the plurality of data qubits, based on the second state data, the third energy term being to reduce the energy as a number of data qubits each being a third data qubit increases, the third data qubit being identified both as the first data qubit and as the second data qubit; and
determining, by the processor, that a Y error has occurred on the third data qubit, the Z error has occurred on the first data qubit that is not identified as the third data qubit, and the X error has occurred on the second data qubit that is not identified as the third data qubit.

7. An information processing apparatus comprising:
a memory configured to store therein an energy equation, the energy equation including a first energy term, a second energy term, and a third energy term, the first energy term being used to identify, based on first state data, a first data qubit with a Z error among a plurality of data qubits included in a logical qubit in quantum computation, the second energy term being used to identify a second data qubit with an X error among the plurality of data qubits, based on second state data, the third energy term being to reduce an energy represented by the energy equation as a number of data qubits each being a third data qubit increases, the first state data indicating states of a plurality of first ancilla qubits used for Z error detection on the plurality of data qubits, the second state data indicating states of a plurality of second ancilla qubits used for X error detection on the plurality of data qubits, the third data qubit being identified both as the first data qubit and as the second data qubit; and
a processor coupled to the memory and configured to:
obtain the first state data and the second state data;
determine, based on the energy equation stored in the memory, a combination of the first data qubit and the second data qubit that further reduces the energy represented by the energy equation; and
determine that a Y error has occurred on the third data qubit, the Z error has occurred on the first data qubit that is not identified as the third data qubit, and the X error has occurred on the second data qubit that is not identified as the third data qubit.

* * * * *